US010082715B2

(12) United States Patent
Okada et al.

(10) Patent No.: US 10,082,715 B2
(45) Date of Patent: Sep. 25, 2018

(54) CONDUCTIVE ELEMENT AND LIQUID CRYSTAL DISPLAY ELEMENT

(71) Applicant: Sharp Kabushiki Kaisha, Osaka (JP)

(72) Inventors: Kuniaki Okada, Osaka (JP); Seiichi Uchida, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/501,396

(22) PCT Filed: Jul. 29, 2015

(86) PCT No.: PCT/JP2015/071442
§ 371 (c)(1),
(2) Date: Feb. 2, 2017

(87) PCT Pub. No.: WO2016/021453
PCT Pub. Date: Feb. 11, 2016

(65) Prior Publication Data
US 2017/0227802 A1    Aug. 10, 2017

(30) Foreign Application Priority Data

Aug. 5, 2014    (JP) ................................ 2014-159378

(51) Int. Cl.
*G02F 1/136*    (2006.01)
*G02F 1/1343*    (2006.01)
(Continued)

(52) U.S. Cl.
CPC ...... *G02F 1/1368* (2013.01); *G02F 1/133345* (2013.01); *G02F 1/133707* (2013.01);
(Continued)

(58) Field of Classification Search
CPC combination set(s) only.
See application file for complete search history.

(56) References Cited

U.S. PATENT DOCUMENTS

2007/0195250 A1    8/2007    Onogi et al.
2007/0242204 A1    10/2007    Fujita et al.
(Continued)

FOREIGN PATENT DOCUMENTS

JP    2007-248736 A    9/2007
JP    2007-256980 A    10/2007
(Continued)

*Primary Examiner* — Wen-Ying P Chen
(74) *Attorney, Agent, or Firm* — Chen Yoshimura LLP

(57) ABSTRACT

A conductive element includes: a first conductive film; a second conductive film connected to the first conductive film; a first insulating film covering the first conductive film and disposed in a layer below the second conductive film, the first insulating film having a contact hole exposing at least an edge face of the first conductive film and thereby connecting the second conductive film to the first conductive film; a second insulating film disposed in a layer above the second insulating film so as to straddle the contact hole; and a third conductive film disposed in a layer above the second conductive film with the second insulating film between the second and third conductive films, the third conductive film having a conductive film opening that contains a location overlapping the edge face of the first conductive film in a plan view.

11 Claims, 18 Drawing Sheets

(51) Int. Cl.
*G02F 1/1368* (2006.01)
*G02F 1/1333* (2006.01)
*G02F 1/1337* (2006.01)
*G02F 1/1362* (2006.01)

(52) U.S. Cl.
CPC ...... *G02F 1/136227* (2013.01); *G02F 1/1362* (2013.01); *G02F 1/134363* (2013.01); *G02F 2001/134318* (2013.01); *G02F 2201/121* (2013.01); *G02F 2201/123* (2013.01); *G02F 2202/16* (2013.01)

(56) References Cited

U.S. PATENT DOCUMENTS

| | | | |
|---|---|---|---|
| 2009/0059110 A1* | 3/2009 | Sasaki | G02F 1/134363 349/39 |
| 2010/0079695 A1* | 4/2010 | Um | G02F 1/136213 349/43 |
| 2013/0043476 A1 | 2/2013 | Sung et al. | |
| 2014/0361295 A1 | 12/2014 | Miyamoto et al. | |

FOREIGN PATENT DOCUMENTS

| | | |
|---|---|---|
| JP | 2013-254219 A | 12/2013 |
| WO | 2013/115050 A1 | 8/2013 |

\* cited by examiner

CONDUCTIVE ELEMENT AND LIQUID CRYSTAL DISPLAY ELEMENT

TECHNICAL FIELD

The present invention relates to a conductive element and a liquid crystal display element.

BACKGROUND ART

In the field of liquid crystal display devices, lateral electric field schemes such as IPS (in-plane switching) and FFS (fringe field switching) have been receiving attention in recent years. Among other things, these schemes are advantageous in that the direction of the electric field applied to the liquid crystal is generally parallel to the substrate surface, which makes it possible to improve visual characteristics more than with a TN (twisted nematic) display or the like. In these liquid crystal display devices using a lateral electric field scheme, liquid crystal is held between a pair of substrates that are arranged facing each other, and a pair of electrodes are disposed on one of the substrates, the TFT substrate, separated by an insulating film, with the electric field for driving the liquid crystal being generated between this pair of electrodes. Accordingly, the normal configuration is for the other substrate, the color filter substrate, not to have an electrode (opposite electrode) for driving the liquid crystal, which contrasts with TN schemes and the like.

Among the liquid crystal display devices using a lateral electric field scheme, in IPS the pair of electrodes arranged on the TFT substrate do not overlap in a plan view, whereas in FFS the pair of electrodes do overlap in a plan view. In FFS, the pair of electrodes is arranged above/below one another with an insulating film therebetween, with one of the electrodes being a pixel electrode and the other being a common electrode. The liquid crystal display device can be operated regardless of whether the electrode disposed lower among the pair of electrodes is the pixel electrode or common electrode. Patent Document 1 below, for example, discloses an FFS liquid crystal display panel in which, among the pair of electrodes, the pixel electrode is disposed lower and the common electrode is disposed higher.

RELATED ART DOCUMENT

Patent Document

Patent Document 1: Japanese Patent Application Laid-Open Publication No. 2013-254219

Problems to be Solved by the Invention

However, in the liquid crystal display panel described in Patent Document 1 above, the pixel electrode of the pair of electrodes connects to an electrode forming a switching device, such as a TFT, via a contact hole. Nonetheless, a level difference is formed in the insulating film inside the contact hole, and thus at the location of this level difference it is harder to form the insulating film in the manufacturing process as compared to other locations, and coverage defects of the insulating film may occur. If such coverage defects of the insulating film occur, there is a risk that the pair of electrodes will contact each other and short-circuit.

In particular, if the edge face of the electrode forming the switching device is exposed in the contact hole, then a level difference corresponding to the thickness of the electrode will be formed in the insulating film disposed inside the contact hole, which makes it easier for coverage defects of the insulating film to occur at locations of the insulating film overlapping the edge face of the electrode in a plan view.

SUMMARY OF THE INVENTION

The technology described in the present specification was made in view of the above problems and aims at preventing or inhibiting a short-circuit between two conductive films disposed with an insulating film therebetween.

Means for Solving the Problems

The technology described in the present specification relates to a conductive element, including: a first conductive film; a first insulating film covering the first conductive film, the first insulating film having a hole exposing at least one edge face of the first conductive film; a second insulating film disposed so as to cover the hole in the first insulating film; and an upper conductive film disposed on or above the second insulating film, the upper conductive film having an opening that includes a location overlapping the at least one edge face of the first conductive film in a plan view.

In the conductive element, a level difference corresponding to the thickness of the first conductive film forms at locations of the second insulating film overlapping an edge face of the first conductive film within the contact hole, which makes it easy for coverage defects of the second insulating film to occur in these overlapping locations. Thus, if the third conductive film were to be disposed in a layer above these overlapping locations, there is a risk that the coverage defects of the second insulating film could cause a short-circuit between the second conductive film and third conductive film.

As a countermeasure to this, the conductive element has a conductive film opening that contains a location where the third conductive film overlaps the edge face of the first conductive film, and thus the third conductive film will not be disposed in a layer above the overlapping locations described above. Therefore, even if a coverage defect of the second insulating film were to occur in the overlapping locations described above, a short-circuit between the second conductive film and third conductive film would be avoided. In this manner, the conductive element makes it possible to prevent or inhibit coverage defects of the second insulating film causing a short-circuit between the second conductive film and third conductive film.

The conductive element may further include a semiconductor film contacting the first conductive film; and a second conductive film made of metal and electrically contacting the semiconductor film on a side opposite to the first conductive film, and the first conductive film may be made of metal A metal film has a greater thickness than a transparent electrode film or the like, and thus the level difference that forms in the second insulating film corresponding to the thickness of this metal film is also greater. The configuration described above makes it possible to reduce the resistance of the first conductive film while preventing or inhibiting coverage defects of the second insulating film from causing short-circuits between the second conductive film and third conductive film.

Only a portion of the metal film containing the one edge face need be exposed in the contact hole.

With this configuration, there is a region in the contact hole where the metal film is not disposed, and thus this region can be made light transmissive, which makes it possible to enhance the area ratio of the pixels in the display area in the semiconductor element, or namely the aperture ratio.

A section of the semiconductor film may be disposed under the hole in the second insulating film, and a resistance of the section may be lower than the rest of the semiconductor film.

With this configuration, it is not necessary to have an extra step in the manufacturing process of the conductive element for forming the second conductive film in addition to the semiconductor film, which can simplify the manufacturing process.

The semiconductor film may be made of an oxide semiconductor.

A semiconductor film made of an oxide semiconductor has a higher electron mobility than a semiconductor film made of an amorphous silicon semiconductor or the like. Thus, the configuration described above makes it possible for the conductive element to have a variety of functions.

The oxide semiconductor may contain indium (In), gallium (Ga), zinc (Zn), and oxide (O). In such a case, the oxide semiconductor may be a crystalline oxide semiconductor.

This configuration is suitable for making the conductive element multifunctional.

Another technology described in the present specification relates to a liquid crystal display element, including: a first substrate having the conductive element described above formed thereon; a second substrate facing the first substrate; and a liquid crystal layer containing liquid crystal molecules between the first substrate and the second substrate, wherein the second conductive film is a pixel electrode in each pixel, and wherein the upper conductive film is a common electrode having a plurality of slit openings and generating an electric field between the common electrode and the pixel electrode to control an orientation of the liquid crystal molecules.

In a liquid crystal display device where the pixel electrodes are arranged in a layer above the common electrode, the common electrode is not disposed in a location overlapping the contact hole in a plan view in order for the pixel electrodes to connect to the metal film of the drain electrodes and the like in the contact hole; thus, it is unlikely that short-circuits caused by coverage defects of the second insulating film in the contact hole will occur between the pixel electrodes and common electrode. In contrast, in a configuration in which the pixel electrodes are arranged in a layer below the common electrode, the common electrode can also be disposed in locations overlapping the contact hole in the plan view by having an insulating film therebetween, even if the pixel electrodes connect to the metal film of the drain electrodes and the like in the contact hole; thus, it is easy for short-circuits caused by coverage defects of the second insulating film in the contact hole to occur between the pixel electrodes and common electrode. However, with the configuration described above, it is possible for the display element to have the pixel electrodes in a layer above the common electrode while preventing or inhibiting short-circuits between the pixel electrodes and common electrode.

The opening in the upper conductive film may connect two of the slit openings that are adjacent.

This configuration makes it possible to extend the area where the second conductive film opposes the edges of the slit openings in the third conductive film more than if two slit openings with adjacent conductive film openings were not connected together. Thus, if the liquid crystal layer is disposed in a layer above the third conductive film, it is possible to widen the range of potential orientation control of the liquid crystal and to enhance the transmittance of the liquid crystal display element.

The opening in the upper conductive film may overlap one end of one of the slit openings.

With this configuration, the slit opening extends to the conductive film opening, which makes it possible to extend the area where the second conductive film opposes the edges of the slit opening in the third conductive film more than if the conductive film opening did not overlap an edge of the slit opening. Thus, if the liquid crystal layer is disposed in a layer above the third conductive film, it is possible to widen the range of potential orientation control of the liquid crystal and to enhance the transmittance of the liquid crystal display element.

Effects of the Invention

The technology described in the present specification makes it possible to prevent or inhibit a short-circuit between two conductive films disposed with an insulating film therebetween.

DETAILED DESCRIPTION OF EMBODIMENTS

Embodiment 1

Figure 1:
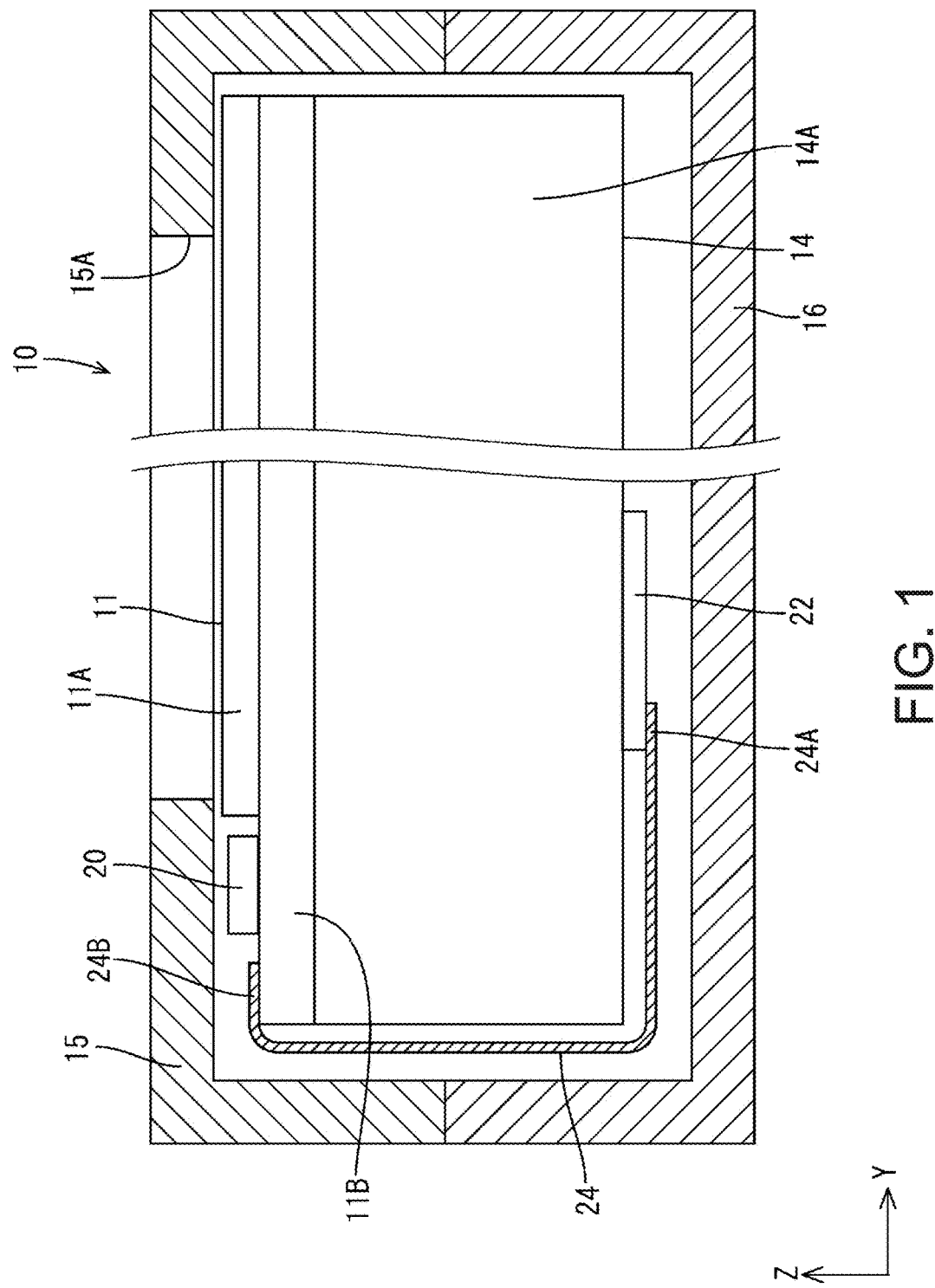
FIG. 1 is a schematic cross-sectional view taken along the lengthwise direction of a liquid crystal display device of Embodiment 1.

Embodiment 1 will be explained with reference to FIGS. 1 to 10. In the present embodiment, a liquid crystal display device 10 including a liquid crystal panel (one example of a liquid crystal display element) 11 will be described as an example. Each of the drawings indicates an X axis, a Y axis, and a Z axis in a portion of the drawings, and each of the axes indicates the same direction for the respective drawings. The up and down direction in the drawings is based on the up and down direction in FIG. 1, and the upper side in FIG. 1 is referred to as the front side while the lower side thereof is referred to as the rear side.

Figure 2:
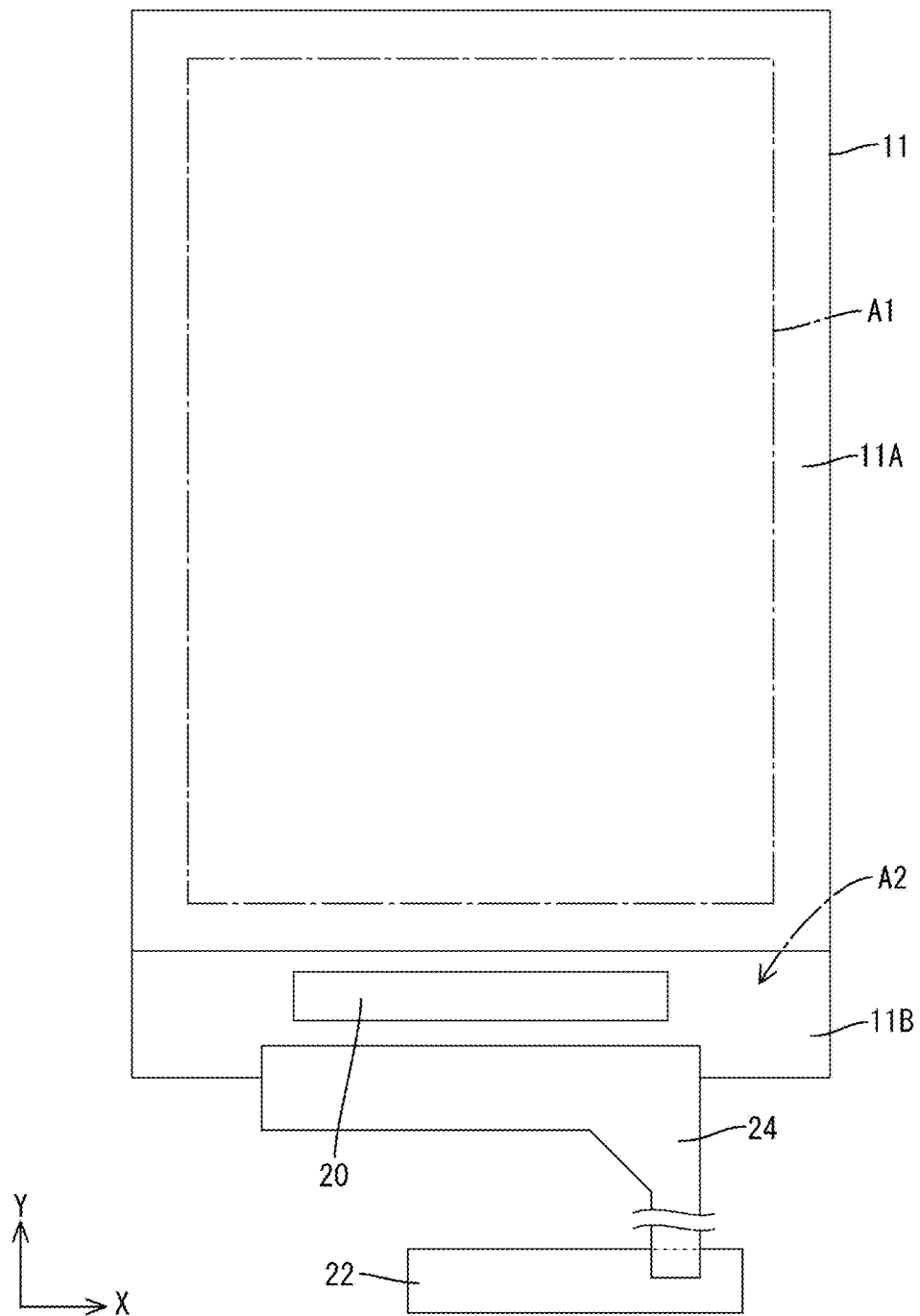
FIG. 2 is a schematic plan view of a liquid crystal panel.

As shown in FIGS. 1 and 2, the liquid crystal display device 10 includes the liquid crystal panel 11, an IC chip 20, which is an electronic component that is mounted on and drives the liquid crystal panel 11, a controller substrate 22 that externally supplies various types of input signals to the IC chip 20, a flexible substrate 24 that electrically connects the liquid crystal panel 11 and the external controller substrate 22, and a backlight device 14, which is an external light source that supplies light to the liquid crystal panel 11. Furthermore, the liquid crystal display device 10 includes front and rear external members 15 and 16 for housing and holding the liquid crystal panel 11 and the backlight device 14, which are attached together, and the front external member 15 has an opening 15A that allows an image displayed on the liquid crystal panel 11 to be viewed from outside.

First, the backlight device 14 will be briefly explained. As shown in FIG. 1, the backlight device 14 includes a generally box-shaped chassis 14A that opens towards the front, a light source (cold cathode fluorescent tube, LED, organic EL, etc.; not shown) disposed inside the chassis 14A, and an optical member (not shown) disposed so as to cover the opening in the chassis 14A. The optical member has functions such as converting light emitted from the light source into planar light. The light that has passed through the optical member to become planar light enters the liquid crystal panel 11 and is used to display an image on the liquid crystal panel 11.

Next, the liquid crystal panel 11 will be described. As shown in FIG. 2, the liquid crystal panel 11 has a vertically-long rectangular shape as a whole, the lengthwise direction of which matches the Y-axis direction in each drawing and the widthwise direction matching the X-axis direction in each drawing. A large portion of the liquid crystal panel 11 is a display area A1 where images can be displayed, and the location on the panel towards one edge thereof in the lengthwise direction (the bottom in FIG. 2) is a non-display area A2 where images are not displayed. The IC chip 20 and flexible substrate 24 are mounted on a portion of the non-display area A2. As shown in FIG. 2, in the liquid crystal panel 11, the frame-shaped dot-dash line that is slightly smaller than the color filter substrate 11A (described later) forms the external shape of the display area A1, and the area outside this dot-dash line is the non-display area A2.

Figure 3:
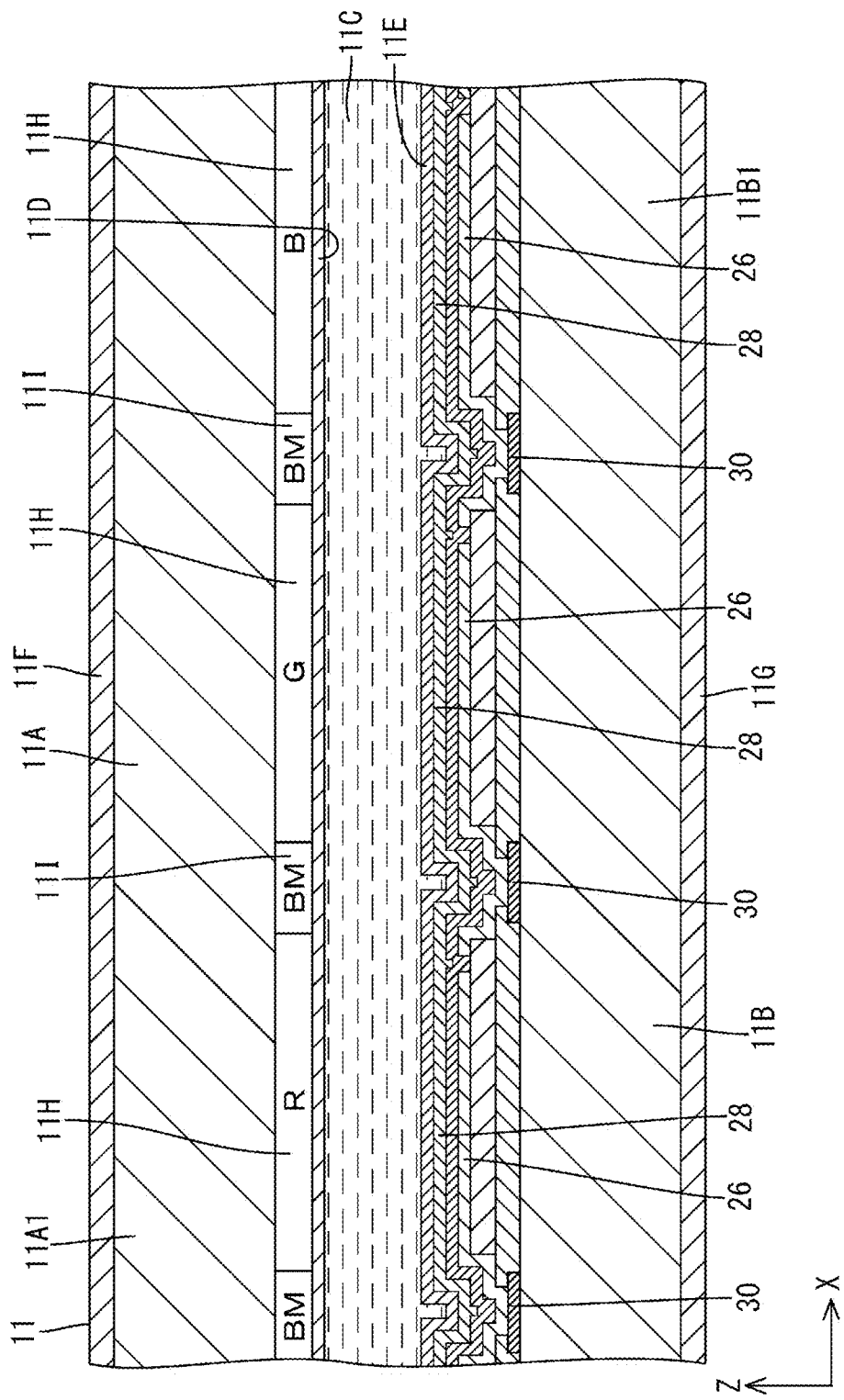
FIG. 3 is a schematic cross-sectional view that shows a cross-sectional configuration of the liquid crystal panel.

As shown in FIG. 3, the liquid crystal panel 11 includes a pair of glass substrates 11A and 11B with excellent transmissive characteristics, and a liquid crystal layer 11C having liquid crystal molecules, which are a material whose optical characteristics change in accordance with the electrical field applied thereto. Both substrates 11A and 11B constituting the liquid crystal panel 11 are bonded together by a sealant (not shown) in a state in which a cell gap equivalent to the thickness of the liquid crystal layer 11C is maintained between the substrates. Between both substrates 11A and 11B, the front (upper) substrate 11A is the color filter substrate (one example of a second substrate) 11A, and the rear (back) substrate 11B is the array substrate (one example of a first substrate) 11B. Alignment films 11D and 11E for aligning the liquid crystal molecules included in the liquid crystal layer 11C are respectively formed on the inner surface sides of the two substrate 11A and 11B. Both substrates 11A and 11B are constituted by generally transparent glass substrates 11A1 and 11B1, and polarizing plates 11F and 11G are respectively attached to the outer surfaces of these glass substrates 11A1 and 11B1.

As shown in FIG. 2, among both substrates 11A and 11B, the color filter substrate 11A has approximately the same widthwise dimensions as the array substrate 11B, whereas the lengthwise dimensions are smaller than the array substrate 11B, and the substrates are bonded together with one end of the array substrate 11B in the lengthwise direction (the top in FIG. 2) coinciding in position with the color filter substrate. Accordingly, the other end of the array substrate 11B in the lengthwise direction (the bottom in FIG. 1) does not overlap the color filter substrate 11A over a prescribed range, with both front and rear surfaces being exposed to outside, and this exposed area is secured as the mounting area of the IC chip 20 and flexible substrate 24. The glass substrate 11B1 constituting the array substrate 11B has the color filter substrate 11A and polarizing plate 11G bonded to the primary section thereof, and the section secured for the mounting area of the IC chip 20 and flexible substrate 24 does not overlap the color filter substrate 11A and polarizing plate 11G.

Figure 4:
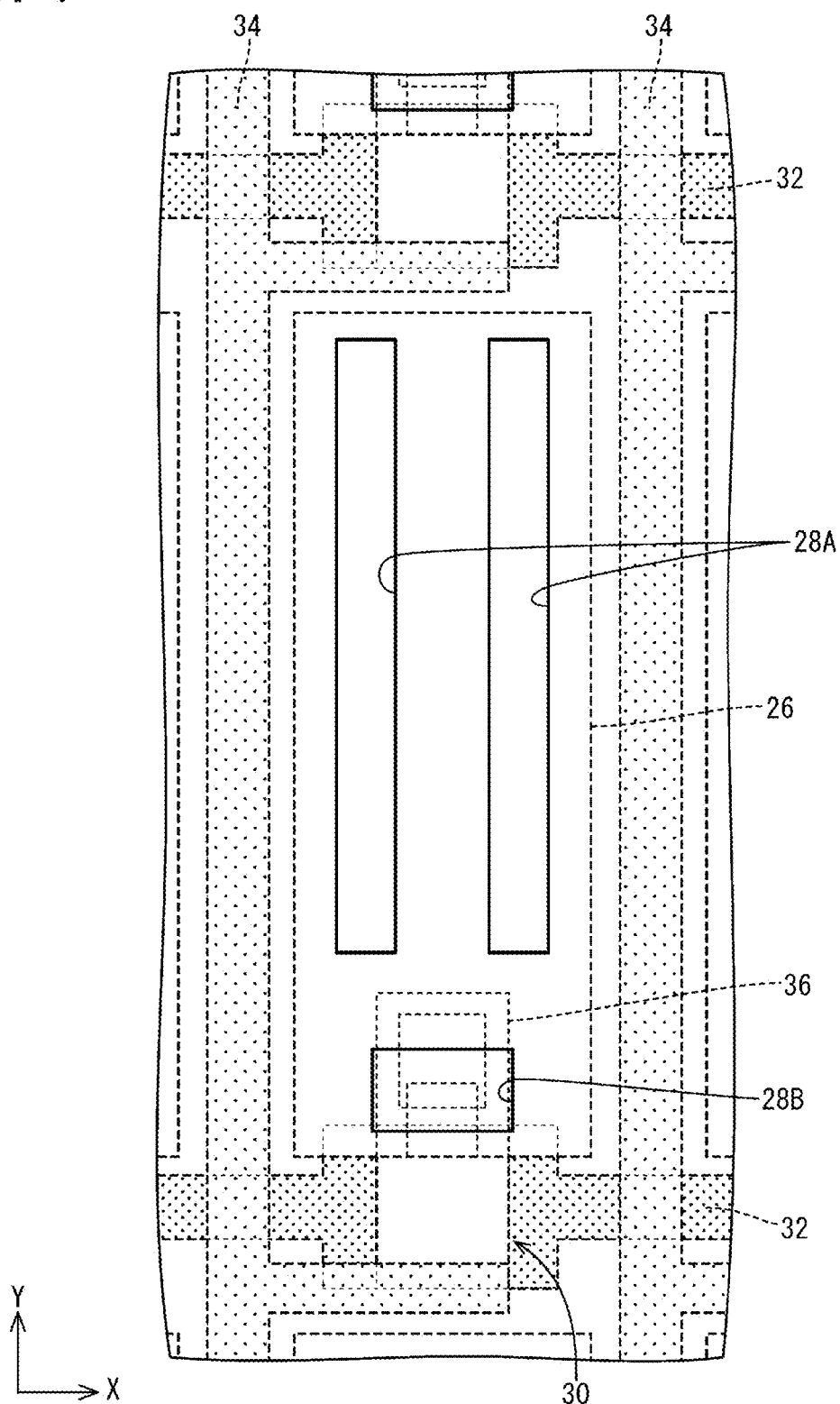
FIG. 4 is a plan view of a planar configuration of a pixel in a display area of an array substrate.

As shown in FIG. 3, the liquid crystal panel 11 of the present embodiment has an FFS operating scheme, and both the pixel electrodes (one example of a second conductive film) 26 and the common electrodes (one example of a third conductive film) 28 are formed on the array substrate 11B side of the pair of substrates 11A and 11B, and these pixel electrodes 26 and common electrodes 28 are disposed in different layers with an insulating film therebetween. The pixel electrodes 26 and common electrodes 28 are both transparent electrode films made of a transparent electrode material. The materials etc. constituting the pixel electrodes 26 and common electrodes 28 will be described in detail later. In the present embodiment, among the pair of electrodes 26 and 28, the pixel electrodes 26 are arranged lower and the common electrodes 28 are arranged higher. As shown in FIGS. 3 and 4, in the display area A1 of the liquid crystal panel 11, a large number of TFTs (thin film transistors) 30, which are switching devices, and pixel electrodes 26 connected to the drain electrodes 30D of the TFTs 30 are provided in a matrix pattern on the inner surface side (liquid crystal layer 11C side) of the glass substrate 11B constituting the array substrate 11B. Meanwhile, in the non-display area A2 of the liquid crystal panel 11, common electrode wiring lines (not shown) are disposed on the array substrate 11B, and these common electrode wiring lines are connected to the common electrodes 28 via a contact hole (not shown).

Next, the configuration of the array substrate 11B in the display area A1 of the liquid crystal panel 11 will be described. As shown in FIG. 4, gate wiring lines 32 and source wiring lines 34, which form a grid shape, are arranged so as to surround the periphery of the TFTs 30 and pixel electrodes 26 arranged in a matrix in the display area A1 of the array substrate 11B. The gate wiring lines 32 extend in the X-axis direction, whereas the source wiring lines 34 extend in the Y-axis direction, and the wiring lines 32 and 34 intersect with one another. The gate wiring lines 32 and source wiring lines 34 are made of a metal film constituted by a plurality of metals stacked together, and a gate insulating film 32I (described later) is interposed between the wiring lines 32 and 34 at the locations where the wiring lines 32 and 34 intersect one another. Furthermore, capacitance wiring lines (not shown) that are parallel to the gate wiring lines 32 are disposed on the array substrate 11B. The metal material etc. constituting the gate wiring lines 32 and source wiring lines 34 will be described in detail later.

As shown in FIG. 4, the pixel electrode 26 has a vertically-long rectangular shape in a plan view of the region surrounded by the gate wiring lines 32 and source wiring lines 34. Meanwhile, the common electrode 28 has a uniformly-planar pattern that straddles a plurality of the pixel electrodes 26 in a layer above the pixel electrodes 26. The location of the common electrode 28 not overlapping with the gate wiring lines 32 in a plan view has two vertically-long slit-shaped openings (hereinafter, "slit opening 28A"). The two slit openings 28A are formed parallel to the source wiring lines 34 with a prescribed gap between the openings and the source wiring lines. These slit openings 28A being formed give the common electrode 28 a generally comb-tooth shape. Furthermore, the position of the common electrode 28 overlapping a portion of the drain electrode 30D (described later) in a plan view has a conductive film opening 28B formed therein. These two slit openings 28A and conductive film opening 28B are respectively formed at each location where the common electrode 28 overlaps the corresponding pixels 26 in a plan view. The function of the slit openings 28A and the placement and function of the conductive film opening 28B will be described in detail later.

Figure 5:
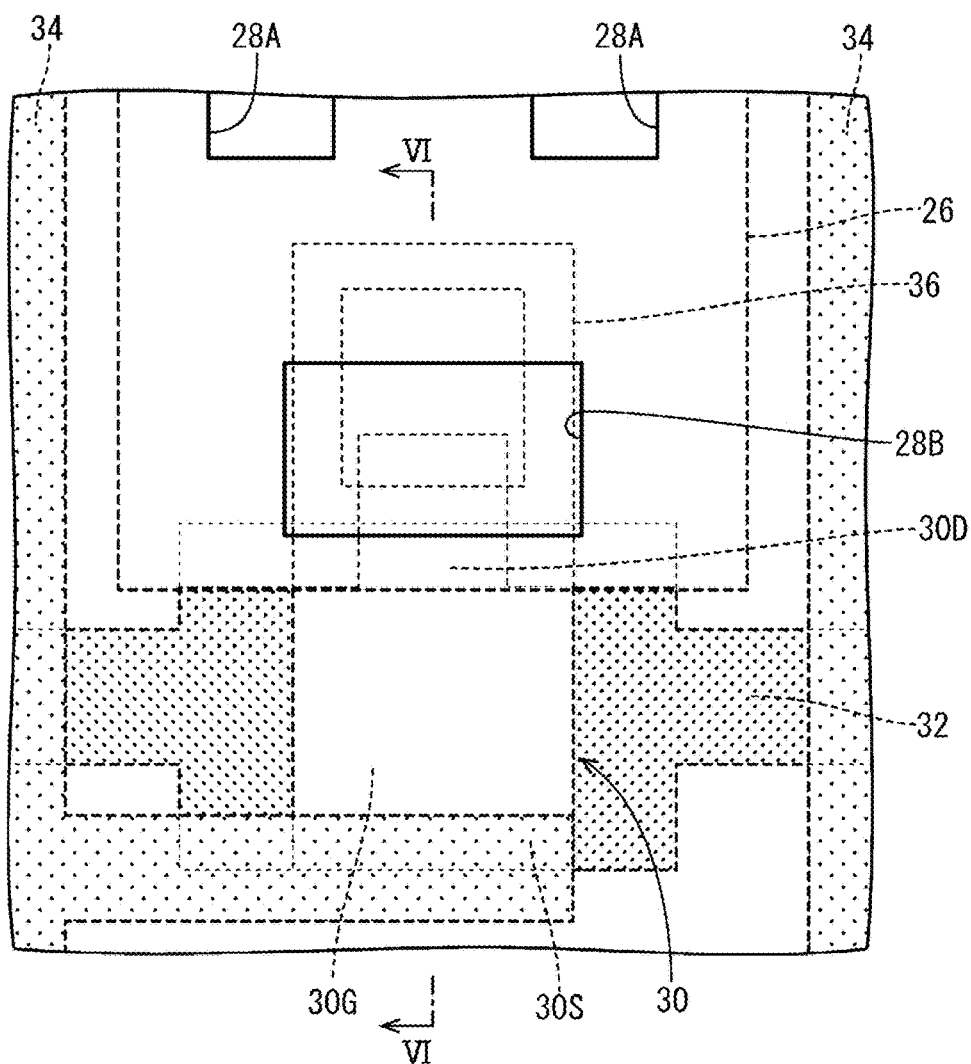
FIG. 5 is an enlarged plan view of the TFT in FIG. 4.

As shown in FIGS. 4 and 5, the TFT 30 is stacked on a layer above the gate wiring line 32, and the entirety of the TFT overlaps the gate wiring line 32 in a plan view. The part of the gate wiring line 32 overlapping the TFT 30 in a plan view forms the gate electrode 30G of the TFT 30. The source wiring line 34 branches from the vicinity of the location where the gate wiring line 32 and source wiring line intersect by extending parallel to the gate wiring line 32, and the tip of the source wiring line 34 that has branched and extended overlaps the gate wiring line 32 in a plan view. The part of the source wiring line 34 overlapping the gate wiring line 32 in a plan view forms the source electrode 30S of the TFT 30. The gate electrode 30G and source electrode 30S are made of a metal film constituted by a plurality of metals stacked together, in a similar manner to the gate wiring line 32 and source wiring line 34. Furthermore, the TFT 30 has an island-shaped drain electrode 30D facing the source electrode 30S with a prescribed gap in the X-axis direction therebetween. The drain electrode 30D is made of a metal film constituted by a plurality of metals stacked together, and the drain electrode overlaps one end of the pixel electrode 26 in a plan view. The part of the gate wiring line 32 overlapping the TFT 30 in a plan view and parts in the vicinity of this overlapping part have a wider line width than other parts.

The various insulating films stacked on the array substrate 11B will be described with reference to FIG. 6. In order from the bottom layer side (the glass substrate 11B1 side), the various insulating films stacked on the array substrate 11B are a gate insulating film 32I, first insulating film IF1, and second insulating film IF2. The gate insulating film 32I is layered above at least the gate wiring line 32 and gate electrode 30G and made of a transparent inorganic material. The first insulating film IF1 is disposed in a layer above at least the semiconductor film 36 (described later) and made of a transparent inorganic material. The second insulating film IF2 is layered above at least the pixel electrode 26 and straddles the contact hole CH1 (described later) and is made of a transparent inorganic material. The material and the like constituting the gate insulating film 32I, first insulating film IF1, and second insulating film IF2 will be described in detail later.

The TFT 30 and the multilayer structure of various films formed in the vicinity of the TFT 30 will be described in detail. As shown in FIG. 6, the TFT 30 includes the gate electrode 30G, a channel section 36C overlapping the gate electrode 30G in a plan view and made of a semiconductor film 36, the source electrode 30S stacked on the semiconductor film 36 to connect to the channel section 36C, and the drain electrode 30D stacked on the semiconductor film 36 to connect to the channel section 36C. Among these, the channel section 36C is a portion of the semiconductor film 36, which is an oxide semiconductor formed on the gate insulating film 32I, and the channel section extends along the Y-axis direction. The channel section 36C makes it possible for electric fields to move between the electrodes by bridging the gap between the source electrode 30S and drain electrode 30D. The source electrode 30S and drain electrode 30D face each other with a prescribed gap therebetween in the extension direction (Y-axis direction) of the channel section 36C. The semiconductor film 36, source electrode 30S, and drain electrode 30D are all covered by the first insulating film IF1. The combination of the drain electrode 30D and the part of the semiconductor film 36 overlapping the drain electrode 30D in a plan view is an example of a first conductive film. Moreover, the combination of the source electrode 30S and the part of the semiconductor film 36 overlapping the source electrode 30S in a plan view is an example of a fourth conductive film. Furthermore, the combination of the various types of conductive films, wiring lines, and insulating films formed on the glass substrate 11B1 of the array substrate 11B is one example of a conductive element.

Figure 6:
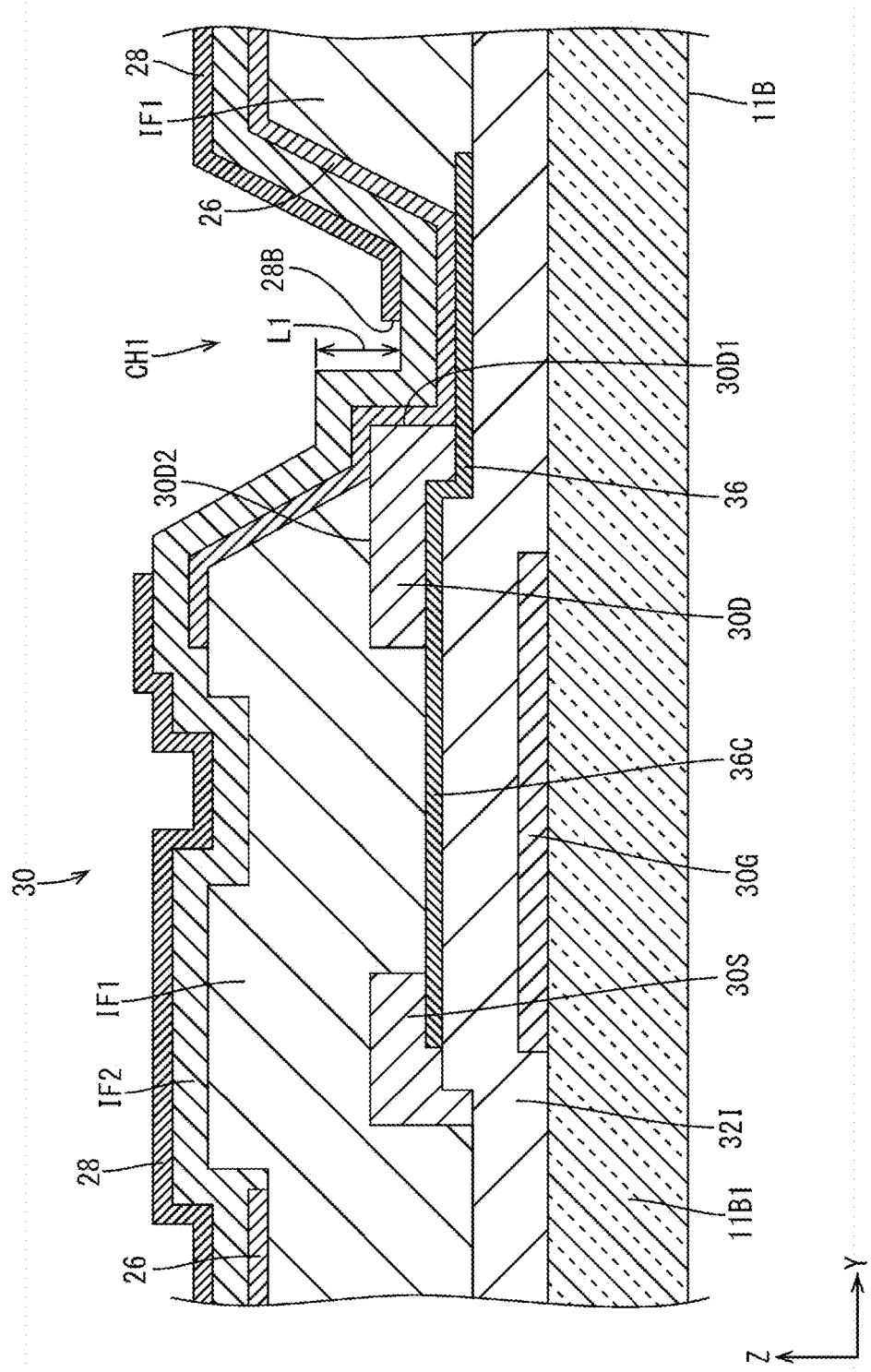
FIG. 6 is a cross-sectional view along the line VI-VI in FIG. 5.

As shown in FIG. 6, the semiconductor film 36 constituting the channel section 36C of the TFT 30 extends to outside of the TFT 30 and extends to the inside of the contact hole CH1 (described later). The specific oxide semiconductor forming the semiconductor film 36 is an In—Ga—Zn—O semiconductor (indium gallium zinc oxide) containing indium (In), gallium (Ga), zinc (Zn), and oxygen (O), for example. The In—Ga—Zn—O semiconductor is a ternary oxide including In (indium), Ga (gallium), and Zn (zinc), and there are no particular limitations to the proportion (composition ratio) of In, Ga, and Zn, which includes In:Ga:Zn=2:2:1, In:Ga:Zn=1:1:1, and In:Ga:Zn=1:1:2 and the like, for example. The oxide semiconductor (In—Ga—Zn—O semiconductor) forming the semiconductor film 36 may be amorphous, but is preferably crystalline. The crystalline oxide semiconductor is preferably a crystalline In—Ga—Zn—O semiconductor with a c-axis oriented mostly perpendicularly to the plane. The crystalline structure of such an oxide semiconductor (In—Ga—Zn—O semiconductor) is described in Japanese Patent Application Laid-Open Publication No. 2012-134475, for example. All the content disclosed in Japanese Patent Application Laid-Open Publication No. 2012-134475 is incorporated by reference in the present specification.

Furthermore, the semiconductor film 36 constituted by the oxide semiconductor has an electron mobility that is approximately 20 to 50 times higher than an amorphous silicon thin film or the like, for example; thus, it is possible to easily shrink the size of the TFT 30 and maximize the transmitted light amount of the pixel electrode 26. Therefore, this is suitable for making the liquid crystal panel 11 high-definition and for reducing the power consumption of the backlight device 14. Moreover, making the material of the channel section 36C an oxide semiconductor increases the OFF characteristics of the TFT 30 and vastly lowers the OFF-leakage current to approximately 1/100th of an amorphous silicon channel section, for example; therefore, this is suitable for increasing the voltage retention rate of the pixel electrode 26 and reducing the power consumption of the liquid crystal panel 11. The TFT 30 having this type of channel section 36C is an inverted staggered TFT constituted by having the gate electrode 30G in the bottommost layer and the channel section 36C stacked in a layer above the gate electrode with the gate insulating film 32I interposed therebetween; the TFT 30 has a multilayer structure that is similar to an ordinary amorphous silicon thin film.

As shown in FIG. 6, the pixel electrode 26 is formed on the first insulating film IF1 and in a layer below the common electrode 28, with the second insulating film IF2 being between the common electrode and the first insulating film. In regard to the first insulating film IF1 disposed in a layer below the pixel electrode 26, the position of the first insulating film overlapping a portion of the drain electrode 30D in a plan view has a contact hole CH1 vertically penetrating therethrough, and the pixel electrode 26 is connected to the drain electrode 30D through this contact hole CH1. This contact hole CH1 exposes one edge face 30D1 of the drain electrode 30D, or more specifically, only the section of the edge faces of the drain electrode 30D that contains the edge face 30D1 opposite to the edge face that opposes the source electrode 30S. When the pixel electrode 26 connects to the drain electrode 30D within the contact hole CH1 and causes the gate electrode 30G of the TFT 30 to become conductive, current flows between the source electrode 30S and drain electrode 30D via the channel section 36C and a prescribed voltage is applied to the pixel electrode 26. The contact hole CH1 is formed in a position that does not overlap with the gate electrode 30G in a plan view.

A reference potential is applied to the common electrode 28 from the common electrode wiring line, and the TFT 30 controlling the potential applied to the pixel electrode 26 makes it possible to generate a prescribed difference in potential between the pixel electrode 26 and the common electrode 28. When a difference in potential is generated between both electrodes 26 and 28, a fringe field (lateral electric field) containing both a component along the surface of the array substrate 11B via the slit openings 28A in the common electrode 28 and a component in the direction intersecting the surface of the array substrate 11B is applied to the liquid crystal layer 11C. Thus, in regard to the liquid crystal molecules contained in the liquid crystal layer 11C, it is possible to appropriately switch the orientation states of both the molecules above the slit openings 28A and the molecules above the common electrode 28. Therefore, it is possible to increase the aperture ratio of the liquid crystal panel 11, achieve a sufficient transmitted light amount, and have a high viewing angle performance.

Furthermore, the conductive film opening 28B is formed in the common electrode 28 so as to straddle a portion within the contact hole CH1, as described above. Specifically, as shown in FIG. 6, this conductive film opening 28B includes a location overlapping in a plan view the edge face 30D1 of the drain electrode 30D exposed within the contact hole CH1 and a portion of a top 30D2 of the drain electrode 30D. As shown in FIG. 5, the conductive film opening 28B has a cuboid shape along the X-axis direction and Y-axis direction in a plan view, and the X-axis direction generally matches the range of the semiconductor film 36.

Next, the configuration of the color filter substrate 11A in the display area A1 of the liquid crystal panel 11 will be described. As shown in FIG. 3, a large number of color filters 11H arranged next to one another in a matrix pattern are provided on the inner surface side (liquid crystal layer 11C) side of the glass substrate 11A1 constituting the color filter substrate 11A so as to overlap the respective pixel electrodes 26 on the array substrate 11B side in a plan view. These color filters 11H are constituted by respective colored portions such as R (red), G (green), and B (blue). A substantially grid-shaped light-shielding film (black matrix) 11Ii for preventing colors from mixing is formed between the respective colored portions constituting the color filter 11H. This light-shielding film 11I overlaps the gate wiring lines 32 and the source wiring lines 34 described above in a plan view. A transparent insulating film (not shown) is formed as a protective film on the inner surface side (liquid crystal layer 11C side) of the color filters 11H and light-shielding film 11I. In the liquid crystal panel 11, one display pixel, which is a display unit of the liquid crystal panel 11, is formed of a group of three colored portions R (red), G (green), and B (blue), and three pixel electrodes 26 opposing these portions. A display pixel is made of a red pixel having an R colored portion, a green pixel having a G colored portion, and a blue pixel having a B colored portion. These respective pixels are repeatedly arranged next to one another along the row direction (X-axis direction) on the surface of the liquid crystal panel 11 to form a pixel group, and a large number of these pixel groups are arranged next to each other along the column direction (Y-axis direction).

The above is a configuration of the liquid crystal panel 11 of the present embodiment, and next one example of a method of manufacturing the liquid crystal panel 11 having a configuration similar to above will be described. The liquid crystal panel 11 of the present embodiment can be manufactured by patterning with an already-known photolithography method. Of the members constituting the liquid crystal panel 11, the method of manufacturing the array substrate 11B in particular will be described in detail below. A method of manufacturing the color filter substrate 11A will be described first. First, the light-shielding film 11I is formed on the glass substrate 11A1 and processed into a generally grid-like pattern via photolithography. The light-shielding film 11I is formed by titanium (Ti), for example, and has a thickness of e.g. 200 nm. Next, the respective colored portions constituting the color filters 11H are formed in the desired locations. Next, a transparent insulating film is formed as the protective film so as to cover the light-shielding film 11I and color filter 11H. This insulating film is made of silicon dioxide (SiO2), for example, and has a thickness of e.g. 200 nm. Thereafter, the alignment film 11D is formed on the surface of the insulating film. The above process completes the color filter substrate 11A.

Next, a method of manufacturing the array substrate 11B will be explained. First, a metal film constituting the gate wiring line 32 and gate electrode 30G is formed on the glass substrate 11B1 and photolithography is used to process the film in the desired pattern. This metal film is a multilayer structure of tungsten (W) at a thickness of 300 nm and silicon nitride (SiNX) at a thickness of 325 nm, for example. Next, the gate insulating film 32I is formed and processed into the desired pattern via photolithography. The gate insulating film 32I is a multilayer structure of silicon dioxide (SiO2) at a thickness of 50 nm and silicon nitride (SiNX) at a thickness of 325 nm, for example. Next, the semiconductor film 36 is formed on the gate insulating film 32I and processed into the desired pattern via photolithography. This semiconductor film 36, as described above, is made of indium gallium zinc oxide (an In—Ga—Zn—O semiconductor) and has a thickness of e.g. 50 nm. Next, a metal film constituting the source wiring line 34, source electrode 30S, and drain electrode 30D is deposited and processed into the desired pattern via photolithography. This conductive film is a three-layer multilayer structure of titanium (Ti) at a thickness of 100 nm, aluminum (Al) at a thickness of 200 nm, and titanium (Ti) at a thickness of 30 nm, for example.

Figure 7:
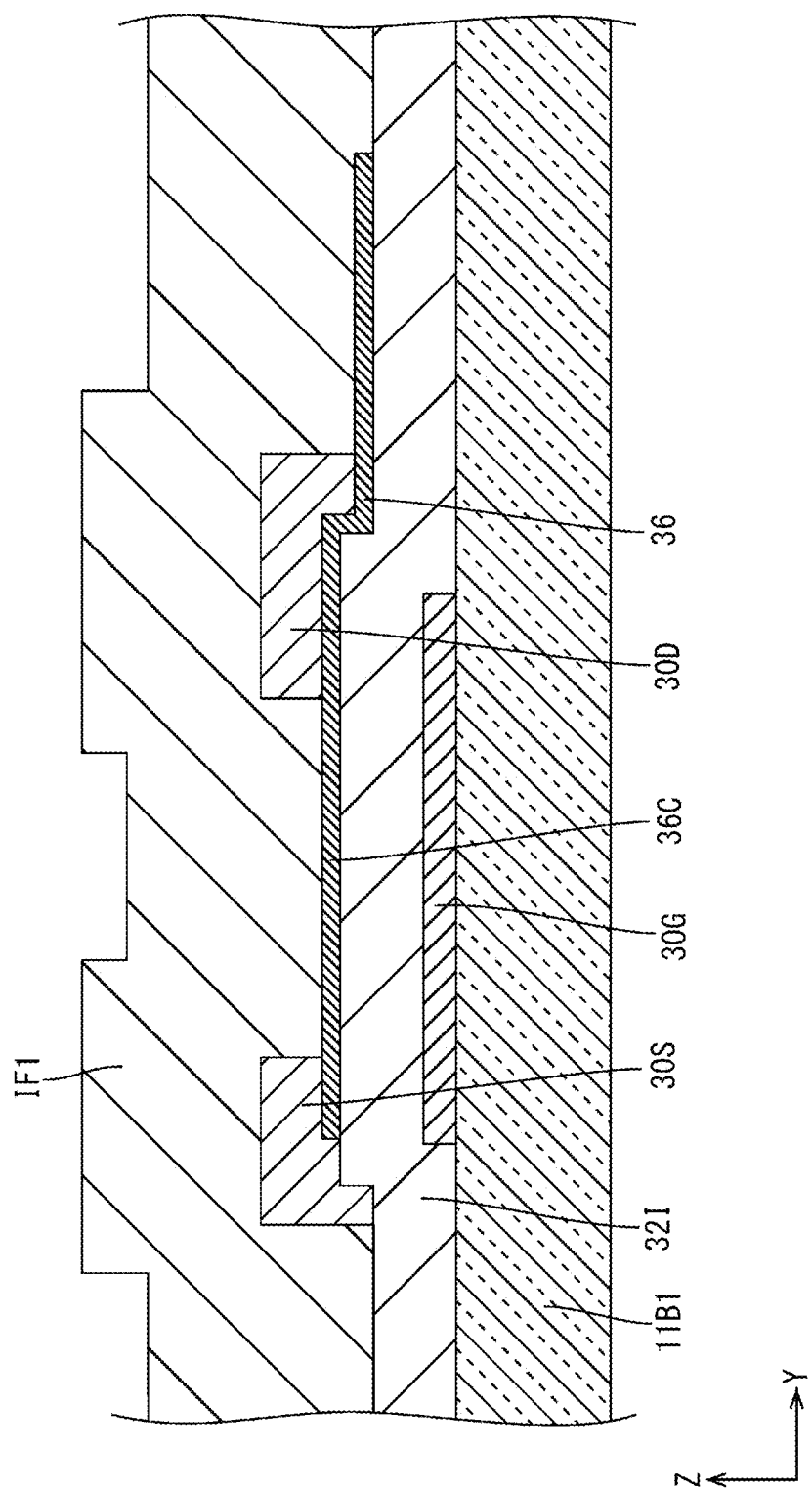
FIG. 7 is a cross-sectional view showing a manufacturing step (1) of a TFT.
Figure 8:
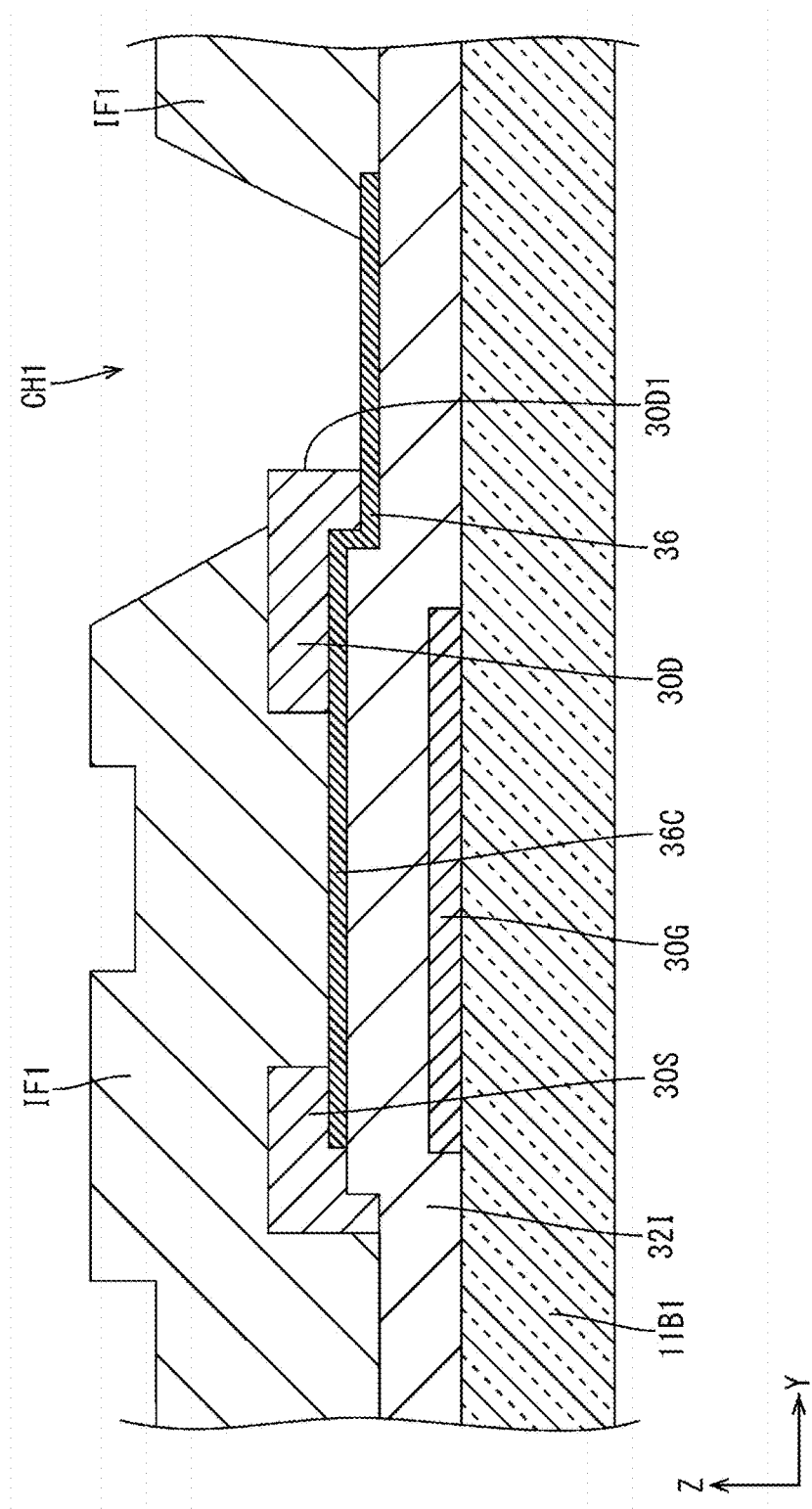
FIG. 8 is a cross-sectional view showing a manufacturing step (2) of the TFT.
Figure 9:
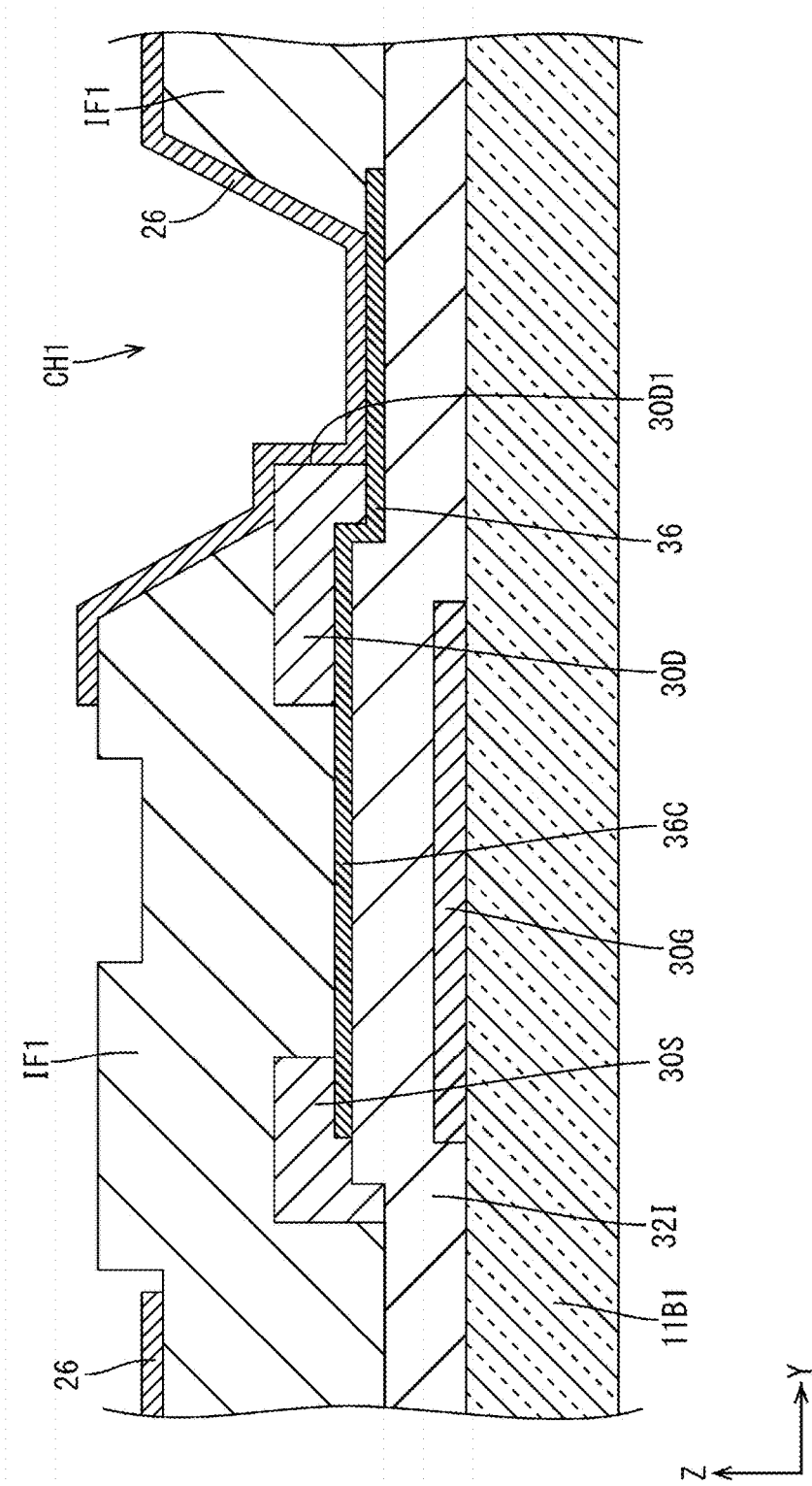
FIG. 9 is a cross-sectional view showing a manufacturing step (3) of the TFT.
Figure 10:
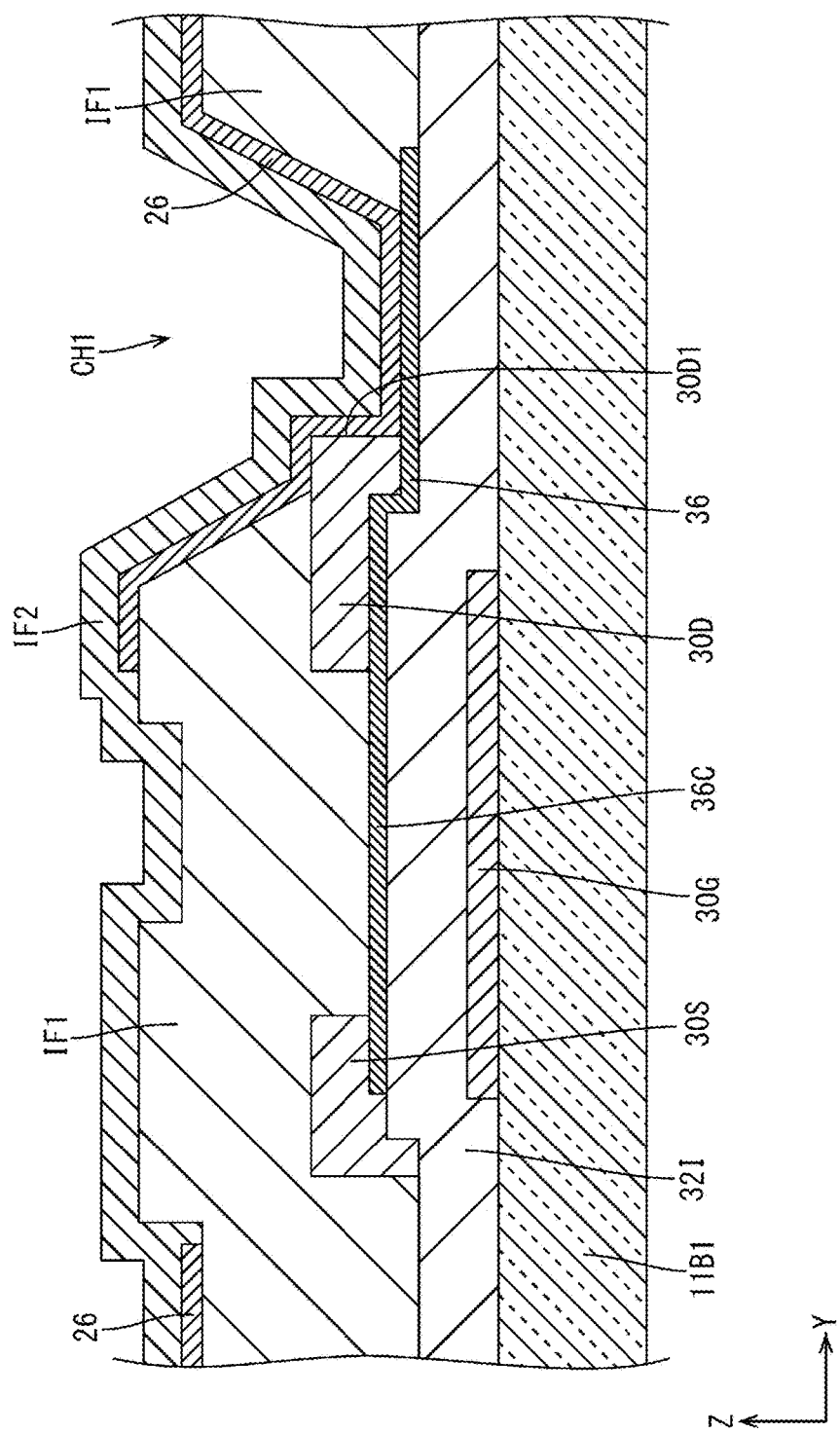
FIG. 10 is a cross-sectional view showing a manufacturing step (4) of the TFT.

Next, as shown in FIG. 7, the first insulating film IF1 is formed so as to cover the gate insulating film 32I, semiconductor film 36, source wiring line 34, source electrode 30S, and drain electrode 30D. This first insulating film IF1 is made of silicon dioxide (SiO2) at a thickness of 300 nm, for example. Next, as shown in FIG. 8, photolithography is used to remove sections of the first insulating film IF1 corresponding to the contact hole CH1, and the contact hole CH1 is formed such that the one edge face 30D1 of the drain electrode 30D is exposed. Next, as shown in FIG. 9, the pixel electrode 26 is formed in a layer above the first insulating film IF1 so as to straddle the contact hole CH1, and patterning is performed via photolithography to align a large number of the pixel electrodes in a matrix pattern in a plan view. The pixel electrode 26 is made of a transparent electrode material such as indium zinc oxide (IZO) at a thickness of 100 nm, for example. Next, as shown in FIG. 10, the second insulating film IF2 is formed so as to cover the first insulating film IF1 and the pixel electrode 26. This second insulating film IF2 is made of silicon nitride (SiN), for example, at a thickness of e.g. 100 nm.

Next, the common electrode 28 is formed in a layer above the second insulating film IF2 so as to straddle the plurality of pixel electrodes 26 and then patterned by photolithography. The common electrode 28 is made of a transparent electrode material such as indium zinc oxide (IZO) at a thickness of 100 nm, for example, in a similar manner to the pixel electrode 26. Thereafter, the alignment film 11E is formed on the surface of the common electrode 28. This alignment film 11E is an optical alignment film made of a polyimide, for example, and illuminating the alignment film with light of a specific wavelength range (ultraviolet, etc.) during the manufacturing process of the array substrate 11B makes it possible to align the liquid crystal molecules along the illumination direction of the light. If a rubbing treatment were to be performed on the alignment film, there is a risk that level differences in the contact hole CH1 and the like would cause disruptions in the alignment and lower the contrast of the images displayed in the display area A1. To address this point, in the present embodiment the alignment film 11E is an optical alignment film, as described above, and does not require a rubbing treatment; therefore, it is possible to inhibit or prevent a reduction in contrast caused by such disruptions in alignment. The above process completes the array substrate 11B.

Next, photospacers are arranged on the alignment film 11E of the array substrate 11B, and both substrates 11A and 11B are bonded together with the alignment film 11E of the array substrate 11B and the alignment film 11D of the color filter substrate 11A each facing inward, thus forming the bonded substrate. Next, the gap between the array substrate 11B and color filter substrate 11A formed by the photospacers is injected with liquid crystal to form the liquid crystal layer 11C between both substrates 11A and 11B. Next, the bonded substrate is cut to the desired size. Thereafter, the polarizing plates 11F and 11G are respectively attached to the outer surface sides of the color filter substrate 11A and the array substrate 11B, thereby completing the liquid crystal panel 11 of the present invention.

In the liquid crystal panel 11 of the present embodiment, as described above, including the one edge face 30D1 of the drain electrode 30D inside the contact hole CH1 formed in the first insulating film IF1 on the array substrate 11B forms a level difference L1 that corresponds to the thickness of the drain electrode 30D at a location on the second insulating film IF2 overlapping the one edge face 30D1 in the contact hole CH1 (see FIG. 6). Thus, in this location on the second insulating film IF2 overlapping the one edge face 30D1, it is easier for coverage defects of the second insulating film IF2 to occur as compared to other locations. Accordingly, if the conductive film opening 28B were not formed in the common electrode 28, or namely if the common electrode 28 were formed in a layer above the overlapping location of the second insulating film IF2, there would be a risk that the pixel electrode 26 and common electrode 28 would short-circuit at the overlapping location due to the coverage defects of the second insulating film IF2. Short-circuiting of the pixel electrode 26 and common electrode 28 may compromise the orientation control of the liquid crystal molecules and cause lighting defects on the liquid crystal panel 11. To address this point, in the present embodiment the conductive film opening 28B is formed in a layer above the overlapping location of the second insulating film IF2, and thus even if a coverage defect occurs in the overlapping location, the pixel electrode 26 and the common electrode 28 do not contact each other, and a short-circuit between the electrodes in the contact hole CH1 is prevented or inhibited.

Furthermore, in the present embodiment, the conductive film opening 28B is formed in only a portion of the contact hole CH1 and not in the entire area of the hole, thereby allowing the common electrode 28 to extend to a location that does not overlap the drain electrode 30D in the contact hole CH1, as shown in FIG. 6. Therefore, a capacitance is formed between the pixel electrode 26 and the common electrode 28 in a portion inside the contact hole CH1, which increases capacitance more than if the common electrode 28 did not extend to inside of the contact hole CH1. As described above, a portion of the semiconductor film 36 extends from the channel portion 36C to below the pixel electrode 26 and drain electrode 30D inside the contact hole CH1, and the pixel electrode 26 and drain electrode 30D each contact the semiconductor film 36. Thus, electrical resistance between the pixel electrode 26 and drain electrode 30D is lower than if the pixel electrode 26 were to contact only the drain electrode 30D.

Moreover, in the present embodiment, the contact hole CH1 exposes only a portion of the drain electrode 30D containing the one edge face 30D1, thus allowing for a region inside the contact hole CH1 where the drain electrode 30D is not disposed. The various types of conductive film and insulating films layered in this region are all formed of transparent materials, and thus this region is light transmissive. Therefore, area ratio of the pixels in the display area A1 of the liquid crystal panel 11, or namely the aperture ratio, can be enhanced more than if the drain electrode were disposed throughout the entire contact hole CH1, for example.

In addition, in the present embodiment, the drain electrode 30D is made of a titanium and aluminum metal film. An electrode made of a metal film is thicker than an electrode made of a transparent electrode material or the like, and thus the level difference that occurs corresponding to this thickness is large, which makes it easier for coverage defects to occur in locations of the second insulating film overlapping the level difference in a plan view. To address this point, in the present embodiment, forming the conductive film opening 28B prevents or inhibits short-circuiting between the pixel electrode 26 and common electrode 28 within the contact hole CH1 even if a coverage defect occurs at the locations on the second insulating film IF2 described above. Meanwhile, the drain electrode 30D being a metal film makes it possible to lower the electrical resistance of the drain electrode 30D more than if the drain electrode 30D were made of a transparent electrode material or the like.

Embodiment 2

Figure 11:
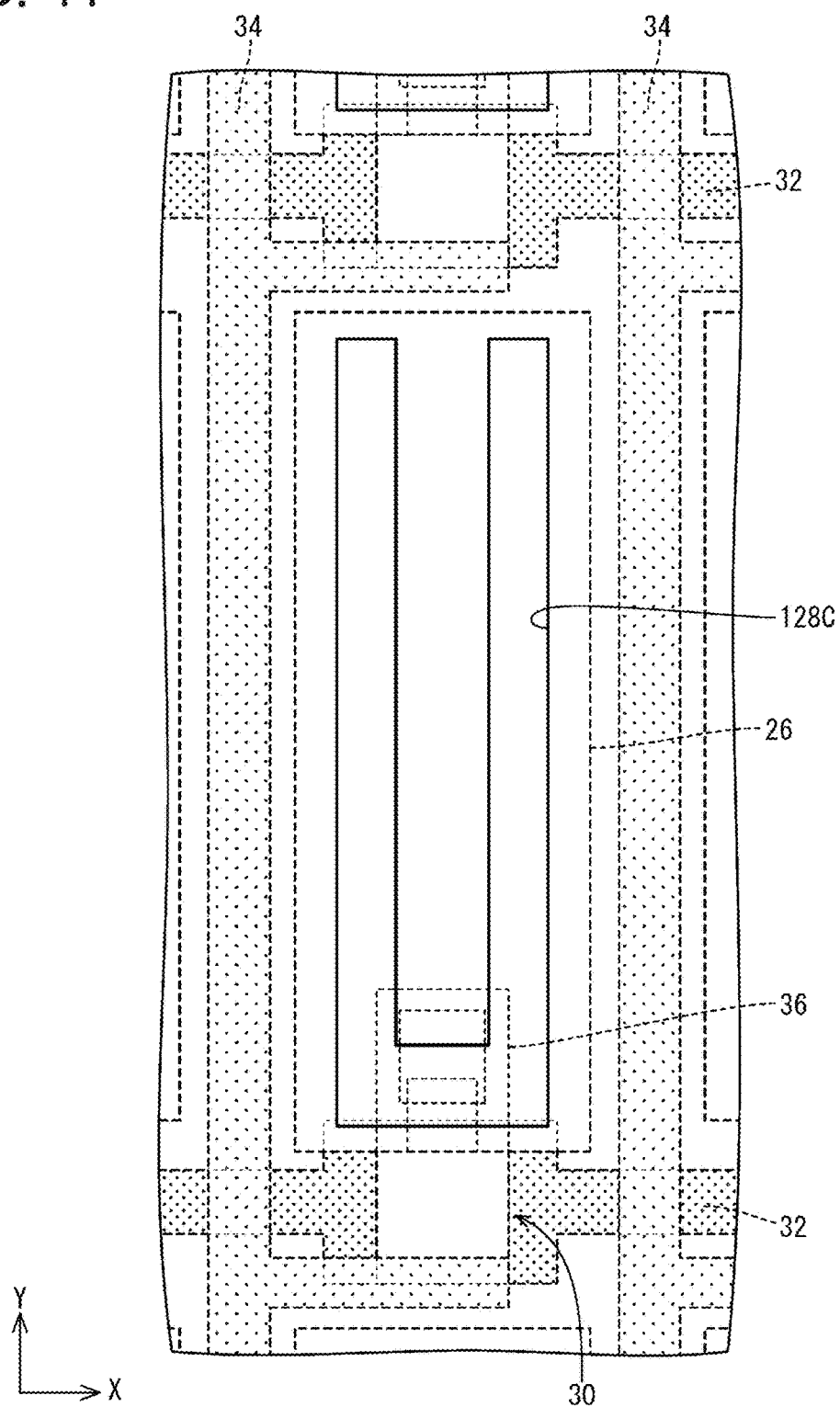
FIG. 11 is a plan view of a planar configuration of a pixel in a display area of an array substrate according to Embodiment 2.

Embodiment 2 will be described with reference to FIG. 11. Embodiment 2 differs from Embodiment 1 in the shape of the opening in the common electrode of the array substrate. Other configurations are the same as those of Embodiment 1, and thus repetitive descriptions of the structures, the operation, and the effect are omitted. As shown in FIG. 11, the opening in the common electrode of the array substrate of the present embodiment (hereinafter, "common electrode opening (one example of a slit opening; one example of a conductive film opening) 128C) has a pattern whereby the conductive film opening 28B of Embodiment 1 connects two slit openings 28A together. In other words, two vertically-long slit-like openings extending with a gap therebetween parallel to the source wiring line 34 each extend along the Y-axis direction toward an opening in a location of the first insulating film overlapping the contact hole, and these openings combine together to form a single common electrode opening 128C.

In the present embodiment, the common electrode opening 128C in the common electrode having the shape described above makes it possible to extend in the Y-axis direction the area where the pixel electrode faces the edges of the opening in the common electrode more than in Embodiment 1. This makes it possible to widen the potential orientation control range of the liquid crystal molecules inside the liquid crystal layer that is provided on the inner surface side of the array substrate, which makes it possible to enhance light transmittance of the liquid crystal panel.

Figure 17:
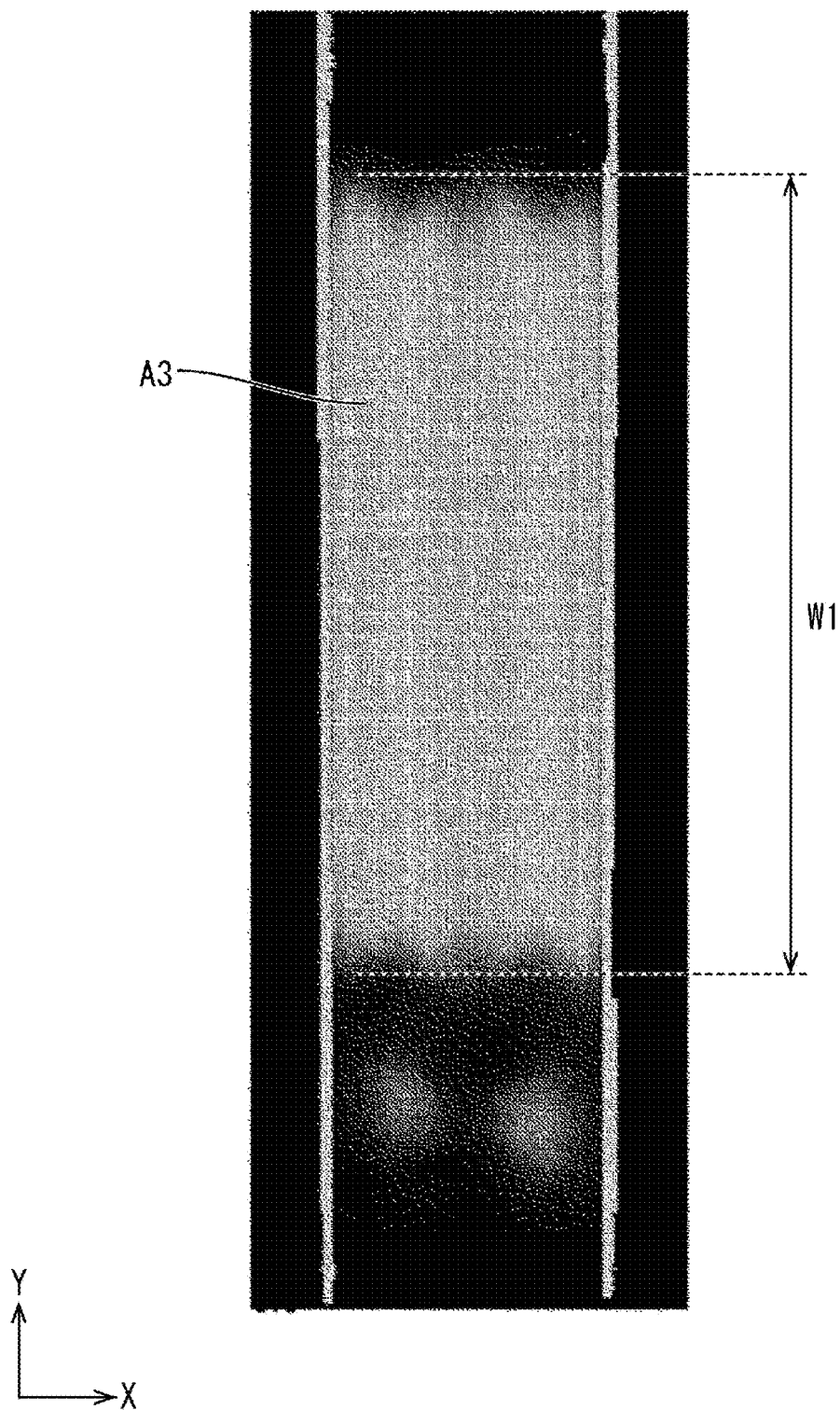
FIG. 17 is a photograph of the pixel of the liquid crystal panel of Embodiment 1 as captured from the front surface.
Figure 18:
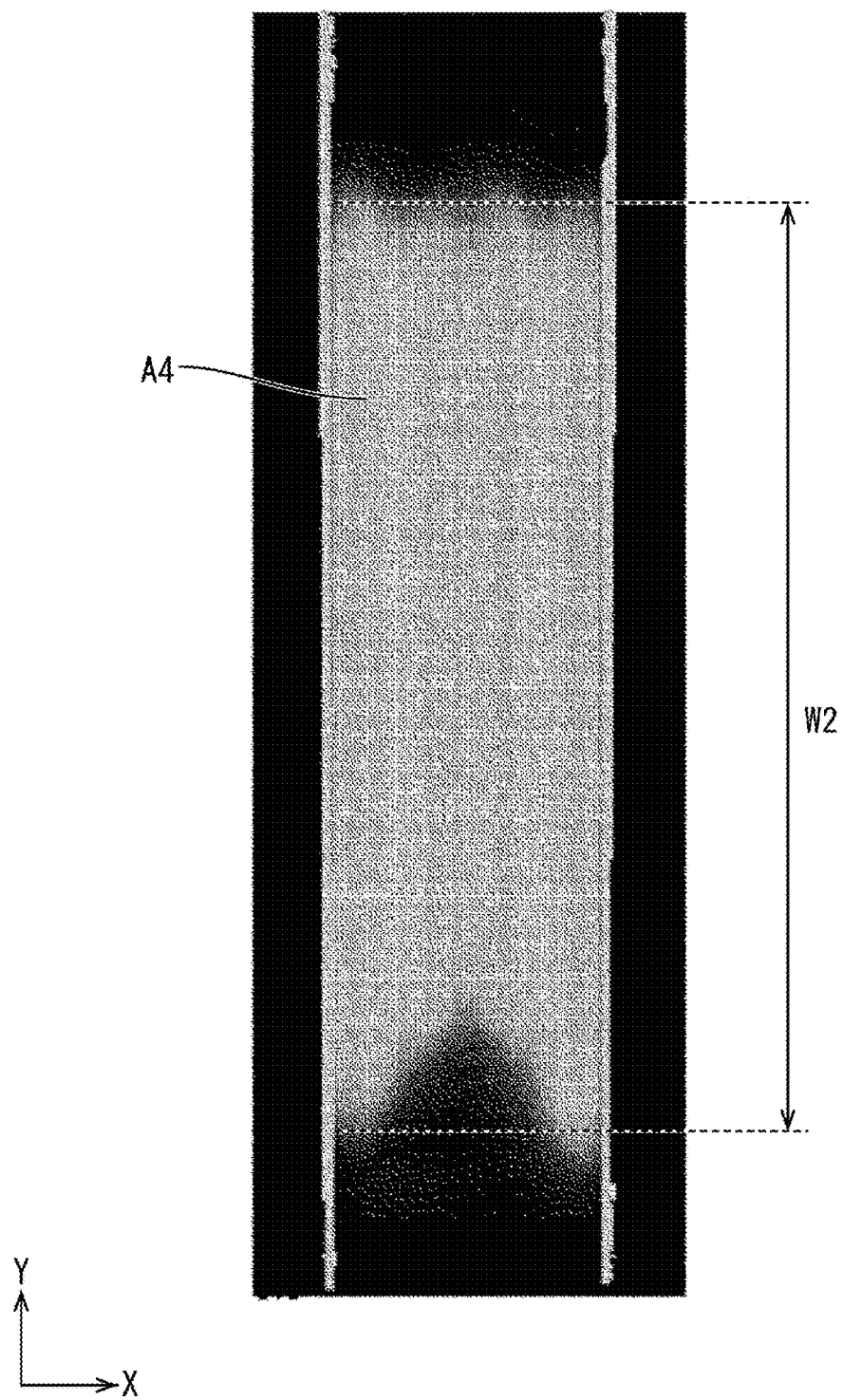
FIG. 18 is a photograph of the pixel of the liquid crystal panel of Embodiment 2 as captured from the front surface.

The results of a study between the difference in size of the light transmissive region of the array substrate 11B of Embodiment 1 and the array substrate of Embodiment 2 will be shown with reference to FIGS. 17 and 18. FIGS. 17 and 18 correspond to plan views of FIGS. 4 and 11, respectively, and reference characters A3 and A4 in the drawings show the respective light transmissive regions. As can be understood from FIGS. 17 and 18, the length dimension W2 along the Y-axis direction of light transmissive region A4 on the array substrate of Embodiment 2 is greater than the length dimension W1 along the Y-axis direction of light transmissive region A3 on the array substrate 11B of Embodiment 1. The results of this study show that the transmittance of light is enhanced in the liquid crystal panel of Embodiment 2.

Embodiment 3

Figure 12:
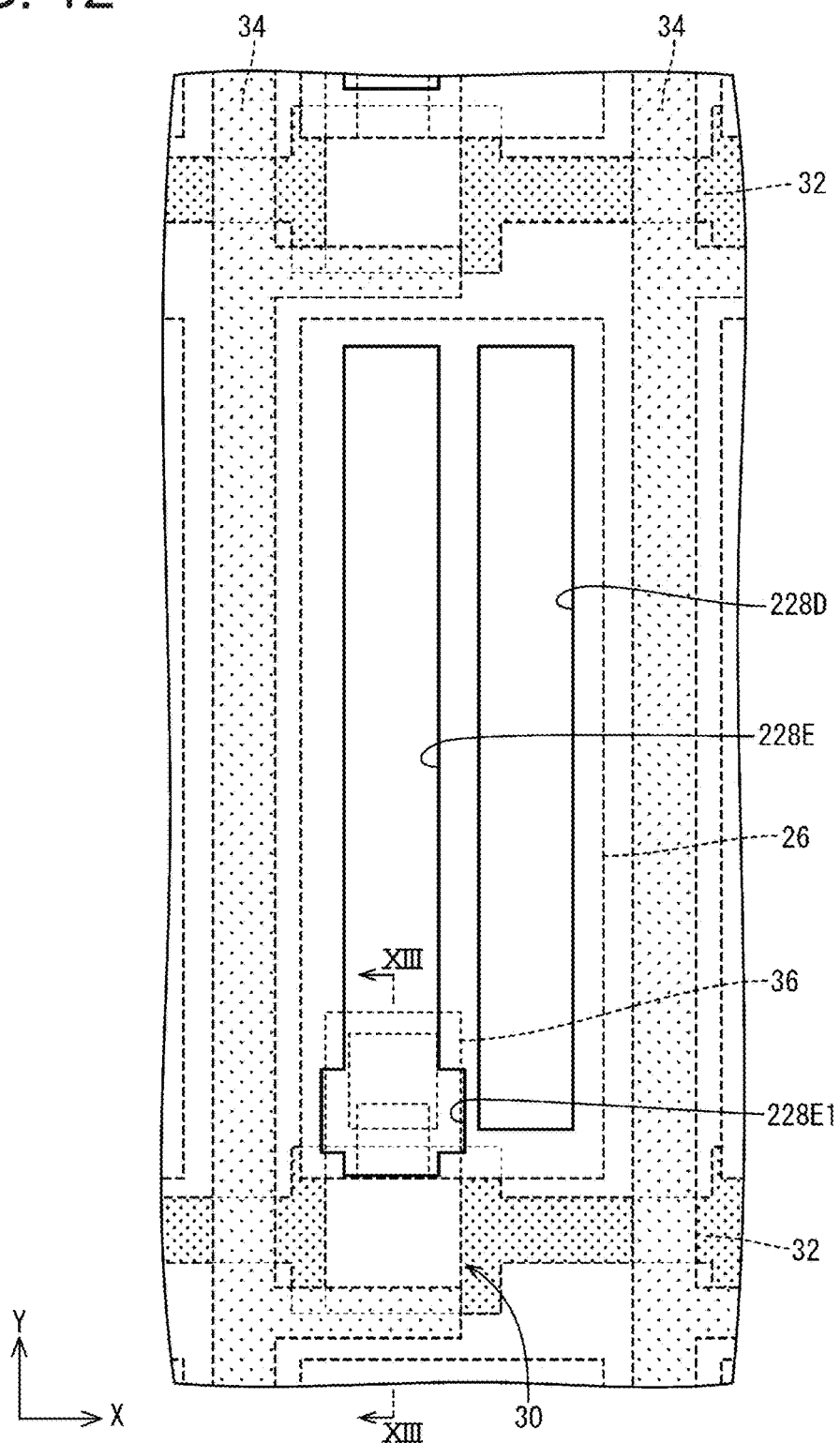
FIG. 12 is a plan view of a planar configuration of a pixel in a display area of an array substrate according to Embodiment 3.

Embodiment 3 will be described with reference to FIGS. 12 and 13. Embodiment 3 differs from Embodiments 1 and 2 in the shape of the hole in a common electrode 228 of an array substrate 211B. Other configurations are the same as those of Embodiment 1, and thus repetitive descriptions of the structures, the operation, and the effect are omitted. As shown in FIG. 12, the conductive film opening 28B of Embodiment 1 is disposed in the common electrode 228 of the array substrate 211B of the present embodiment so as to overlap one edge of a single slit opening 28A. In other words, two openings are formed in the common electrode, and one opening is formed vertically-long and parallel (along the Y-axis direction) to the source wiring line 34 at a location that does not overlap the gate wiring line 32 in a plan view (hereinafter, this opening is referred to as the "first common electrode opening (one example of a slit opening) 228D"). The other opening is formed vertically-long and parallel to the source wiring line 34 with a prescribed gap between this opening and the first common electrode opening 228D (hereinafter, this opening is referred to as the "second common electrode opening (one example of a slit opening; one example of a conductive film opening) 228E"). A wide-width section 228E1 that has width dimensions slightly larger than the other sections is disposed on one edge (the bottom edge in FIG. 12) of the second common electrode opening 228E. This wide-width section 228E1 coincides in plan view placement and shape with the conductive film opening 28B of Embodiment 1. The first common electrode opening 228D and the second common electrode opening 228E both have larger width dimensions (X-axis direction dimensions) than the slit openings 28A of Embodiment 1.

Figure 13:
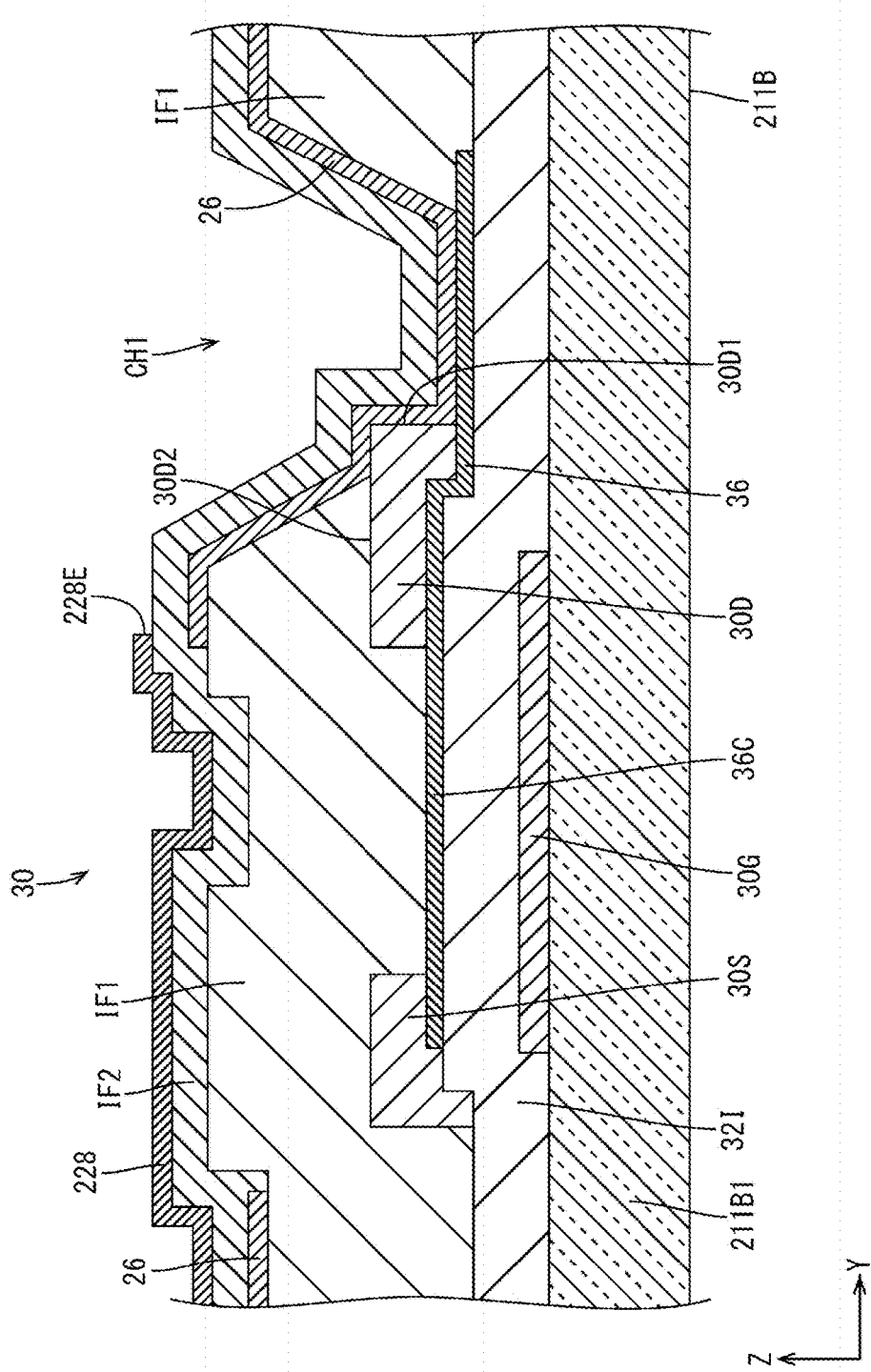
FIG. 13 is a cross-sectional view along the line XIII-XIII in FIG. 12.

In the present embodiment, the above-mentioned shape of the first common electrode opening 228D and the second common electrode opening 228E formed in the common electrode 228 allows the opening in the location of the common electrode 228 overlapping in a plan view the one edge face 30D1 of the drain electrode 30D to continue along the Y-axis direction toward the side away from the TFT 30 when viewing a cross-sectional configuration of the location in the vicinity of the contact hole CH1, as shown in FIG. 13. As shown in FIG. 12, in the present embodiment, it is possible to extend in the Y-axis direction the area where the pixel electrode 26 and the edges of the opening in the common electrode 228 face each other more than in Embodiment 1, in a similar manner to Embodiment 2. This makes it possible to widen the potential orientation control range of the liquid crystal molecules inside the liquid crystal layer that is provided on the inner surface side of the array substrate 211B, which makes it possible to enhance light transmittance of the liquid crystal panel.

Embodiment 4

Figure 14:
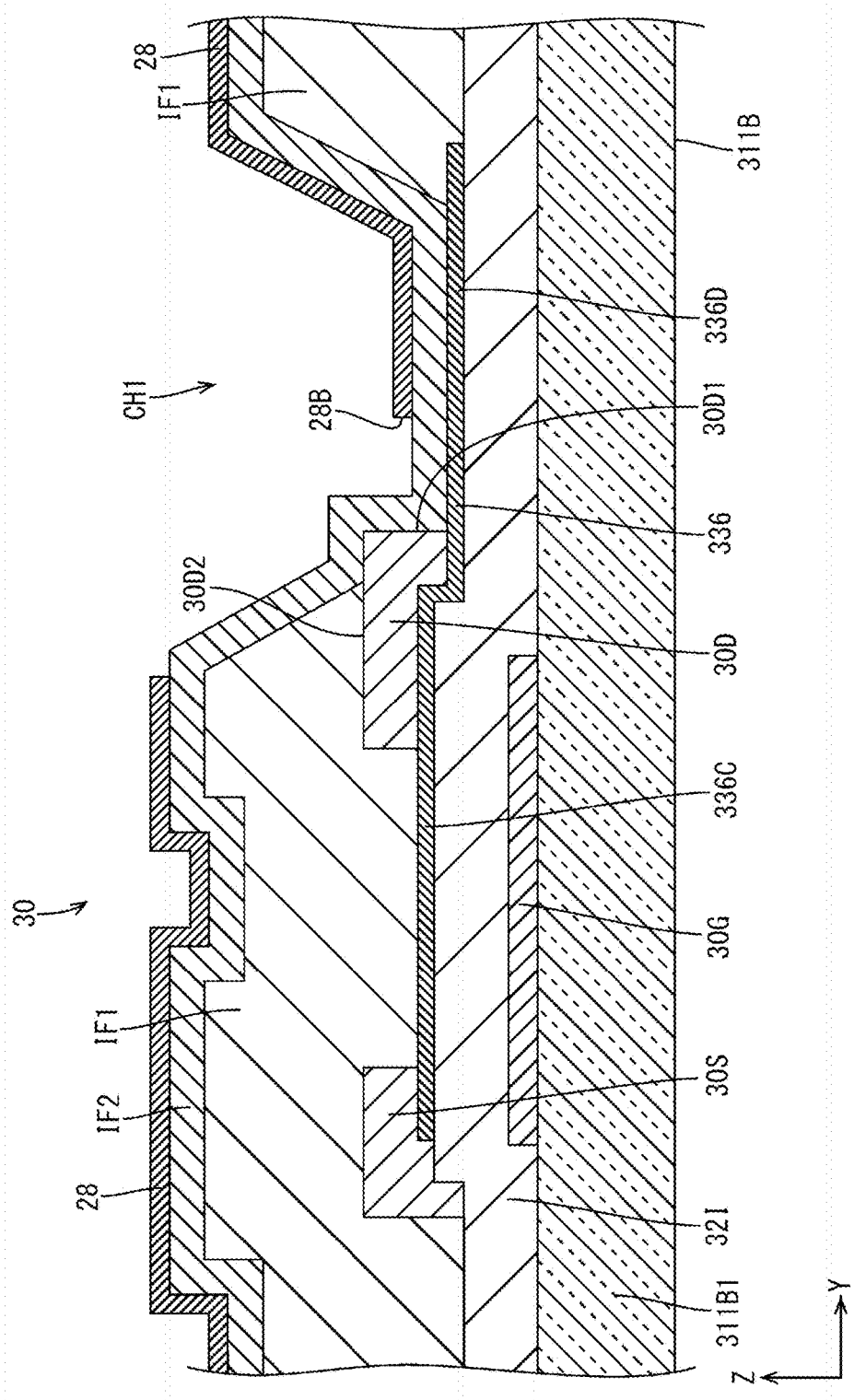
FIG. 14 is a cross-sectional view of a TFT of Embodiment 4.
Figure 15:
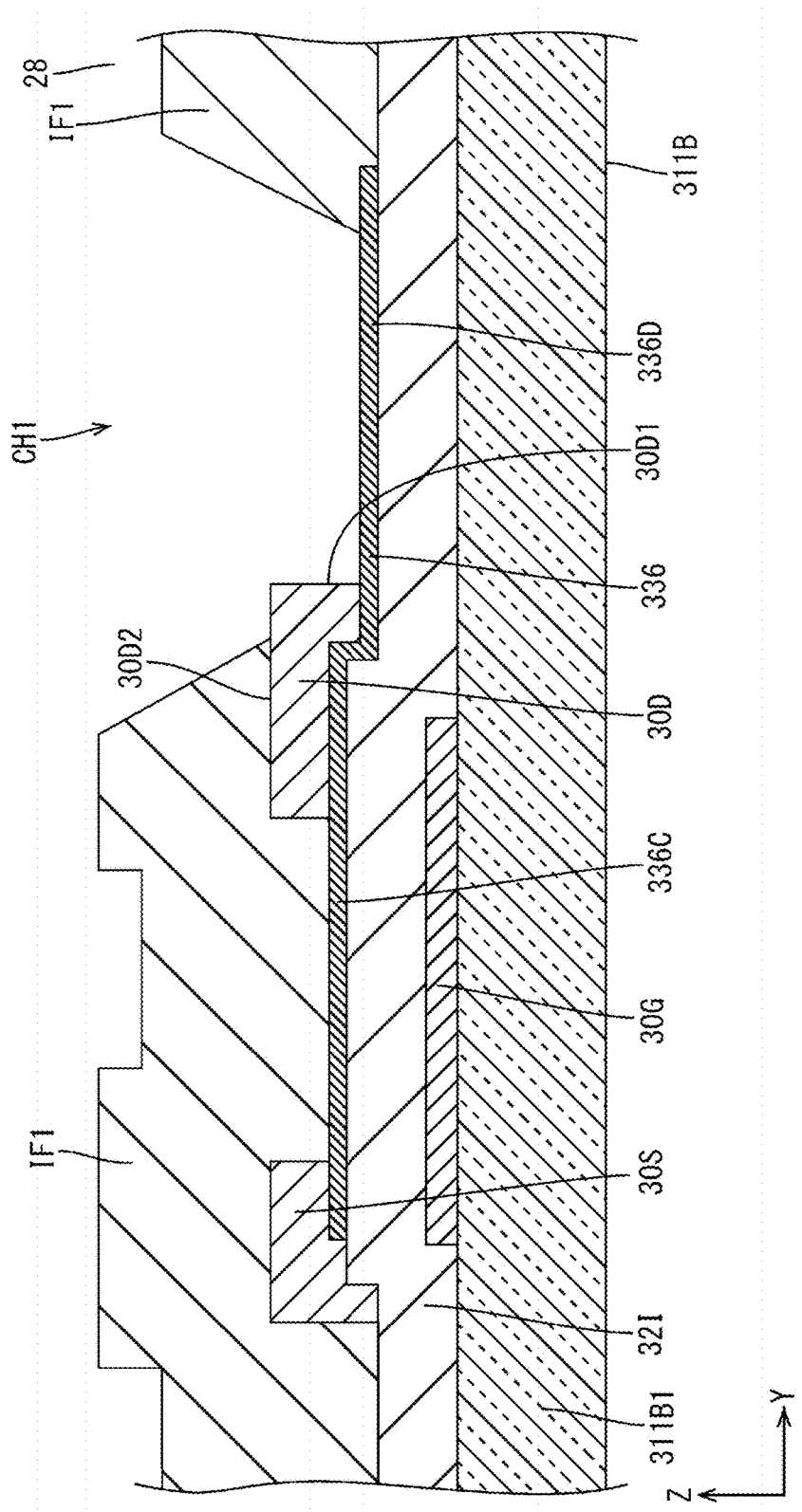
FIG. 15 is a cross-sectional view showing a manufacturing step (1) of the TFT.
Figure 16:
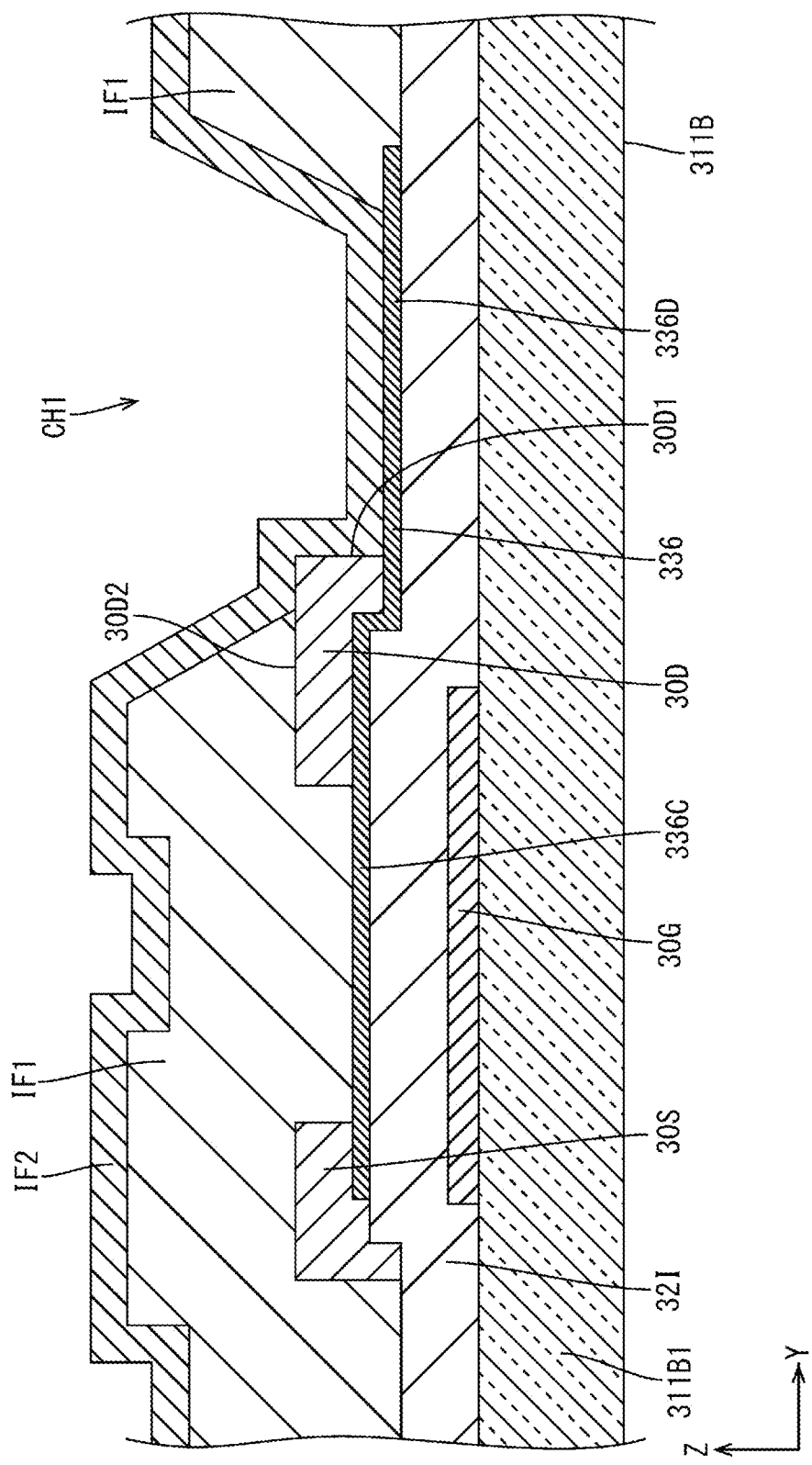
FIG. 16 is a cross-sectional view showing a manufacturing step (2) of the TFT.

Embodiment 4 will be described with reference to FIGS. 14 to 16. Embodiment 4 differs from Embodiment 1 in that a portion of a semiconductor film 336 is used as the pixel electrode. Other configurations are the same as those of Embodiment 1, and thus repetitive descriptions of the structures, the operation, and the effect are omitted. As shown in FIG. 14, in the array substrate 311B of the present embodiment, the pixel electrode is not formed on the first insulating film IF1, and the second insulating film IF2 is formed on the first insulating film IF1, unlike in Embodiment 1. Furthermore, a contact hole CH2 that has a larger plan view size than the contact hole CH1 of Embodiment 1 is formed at a location overlapping a portion of the drain electrode 30D in a plan view. The location of the semiconductor film 336 on the gate insulating film 32I exposed in this contact hole CH2 contacts the second insulating film IF2. The plan view size of the semiconductor film 336 is also larger than in Embodiment 1.

In the present embodiment, the location of the semiconductor film 336 contacting the second insulating film IF2 inside the contact hole CH2 and the locations in the vicinity of this location are used as the pixel electrode. In other words, the contacting location of the semiconductor film 336 and the locations in the vicinity of this location (hereinafter, these locations are referred to as a "conductive portion (one example of a second conductive film) 336D") are made conductive by reducing the resistance during the manufacturing process of the array substrate 311B. When the gate electrode 30G of the TFT 30 is conductive, current flows between the source electrode 30S and the drain electrode 30D via the channel section 36C, and a prescribed voltage is applied to the conductive portion 336D. Therefore, in the array substrate 311B of the present embodiment, the conductive portion 336D, which is a portion of the semiconductor film 336, functions as a pixel electrode that causes a difference in potential with the common electrode 28.

Next, a method of manufacturing the array substrate 311 of the present embodiment will be described. Below, only points that are different from Embodiment 1 will be described. First, in a similar manner to Embodiment 1, the gate wiring line 32, gate electrode 30G, gate insulating film 32I, semiconductor film 336, and first insulating film IF1 are formed in this order on the glass substrate 11B1. Next, as shown in FIG. 14, photolithography is used to remove the first insulating film IF1 at locations corresponding to the contact hole CH2, and the contact hole CH2 is formed to expose the one edge face 30D1 of the drain electrode 30D. Next, as shown in FIG. 15, the second insulating film IF2 made of silicon nitride is formed so as to cover the first insulating film IF1 and straddle the contact hole CH2. At such time, a plasma-enhanced CVD (chemical vapor deposition) apparatus is used to form the second insulating film IF2 made of silicon nitride containing hydrogen.

Forming the second insulating film IF2 in the manner described above diffuses the hydrogen contained in the second insulating film IF2 into the locations of the semiconductor film 336 contacting the second insulating film IF2 and the locations in the vicinity of these locations, which greatly increases the hydrogen concentration of these locations, thus lowering the resistance of these locations and making these locations conductive. This forms the conductive section 336D on a portion of the semiconductor film 336. Thereafter, in a similar manner to Embodiment 1, forming the common electrode 28 and alignment film in this order in a layer above the second insulating film IF2 completes the array substrate 311B of the present embodiment. As described above, in the present embodiment, the conductive portion 336D formed on a portion of the semiconductor film 336 can be used as a pixel electrode as described above, and thus it is not necessary to have an extra step for forming the pixel electrode in addition to the semiconductor film 336 in the manufacturing process of the array substrate 311B, which can simplify the manufacturing process.

Modification examples of the respective embodiments mentioned above are described below.

(1) In the respective embodiments above, an example was shown in which only a portion of the drain electrode containing the one edge face of the drain electrode was exposed in the contact hole, but alternatively the entirety of the drain electrode containing the edge faces of the drain electrode may be exposed in the contact hole. Even in such a case, it is possible for a level difference that corresponds to the thickness of the drain electrode to form in locations of the second insulating film overlapping the edge face of the drain electrode in a plan view; yet, while this makes it easy for coverage defects of the second insulating film to occur in these overlapping locations, the formation of the conductive film opening can prevent or inhibit short-circuits between the second conductive film and third conductive film caused by such coverage defects of the second insulating film.

(2) In the respective embodiments above, an example was shown in which the conductive film opening was formed in only a portion inside the contact hole, but alternatively the conductive film opening may be formed throughout the inside of the contact hole.

(3) In the respective embodiments above, an example was shown in which the semiconductor film extended to inside of the contact hole, but alternatively the semiconductor film may be formed only between the source electrode and drain electrode.

(4) In Embodiment 4, an example was shown in which a plasma-enhanced CVD apparatus was used in the manufacturing process of the array substrate to form the second insulating film made of silicon nitride containing hydrogen, thereby making the locations of the semiconductor film contacting the second insulating film and the locations in the vicinity of these locations conductive, but the method of making a portion of the semiconductor film conductive is not limited to this. Alternatively, in the manufacturing process of the array substrate, an argon plasma process, an annealing process in a reducing atmosphere, etc. that uses an etching apparatus may be performed on the locations of the semiconductor film exposed in the contact hole to lower the resistance of these locations and make these locations conductive, for example.

(5) In addition to the respective embodiments described above, it is possible to appropriately modify the various types of conductive films constituting the array substrate, the materials for forming the various types of insulating films, the thickness, and the like.

The embodiments of the present invention were described above in detail, but these are only examples, and do not limit the scope as defined by the claims. The technical scope defined by the claims includes various modifications of the specific examples described above.

DESCRIPTION OF REFERENCE CHARACTERS 10 liquid crystal display device
11 liquid crystal panel
11A color filter substrate
11A1, 11B1 glass substrate
11B, 211B, 311B array substrate
11C liquid crystal layer
14 backlight device
26 pixel electrode
28, 128, 228 common electrode
28A slit opening
28B conductive film opening
30 TFT
30D drain electrode
30G gate electrode
30S source electrode
32 gate wiring line
32I gate insulating film
34 source wiring line
36, 336 semiconductor film
36C channel section
128C common electrode opening
228D first common electrode opening
228E second common electrode opening
336D conductive portion
CH1, CH2 contact hole
L1 level difference
IF1 first insulating film
IF2 second insulating film

What is claimed is:

1. A conductive element, comprising:
   a first conductive film;
   a first insulating film covering the first conductive film, said first insulating film having a hole exposing at least one edge face of the first conductive film;
   a second insulating film disposed so as to cover the hole in the first insulating film;
   an upper conductive film disposed on or above the second insulating film, the upper conductive film having an opening that includes a location overlapping said at least one edge face of the first conductive film in a plan view, said opening in the upper conductive film straddling over only a portion of said hole in the first insulating film in a plan view so that a portion of the upper conductive film is located inside the said hole in the plan view; and
   a semiconductor film contacting the first conductive film; and
   a second conductive film made of metal and electrically contacting said semiconductor film on a side opposite to the first conductive film,
   wherein the first conductive film is made of metal, and
   wherein a section of the semiconductor film is disposed under the hole in the second insulating film, and a resistance of said section is lower than the rest of the semiconductor film.

2. The conductive element according to claim 1, wherein the semiconductor film is made of an oxide semiconductor.

3. The conductive element according to claim 2, wherein the oxide semiconductor contains indium (In), gallium (Ga), zinc (Zn), and oxide (O).

4. The conductive element according to claim 3, wherein the oxide semiconductor is a crystalline oxide semiconductor.

5. The conductive element according to claim 1, further comprising a third conductive film on the first insulating film and in the hole in the first insulting film so as to contact the first conductive film in the hole, the third conductive film being under the second insulating film.

6. A liquid crystal display element, comprising:
   a first substrate having the conductive element according to claim 5 formed thereon;
   a second substrate facing the first substrate; and
   a liquid crystal layer containing liquid crystal molecules between the first substrate and the second substrate,
   wherein the third conductive film is a pixel electrode in each pixel, and
   wherein the upper conductive film is a common electrode having a plurality of slit openings and generating an electric field between the common electrode and the pixel electrode to control an orientation of the liquid crystal molecules.

7. The liquid crystal display element according to claim 6, wherein the opening in the upper conductive film connects two of the slit openings that are adjacent.

8. The liquid crystal display element according to claim 6, wherein the opening in the upper conductive film overlaps one end of one of the slit openings.

9. A liquid crystal display element, comprising:
   a first substrate having the conductive element according to claim 1 formed thereon;
   a second substrate facing the first substrate; and
   a liquid crystal layer containing liquid crystal molecules between the first substrate and the second substrate,
   wherein said section of the semiconductor film is a pixel electrode in each pixel, and
   wherein the upper conductive film is a common electrode having a plurality of slit openings and generating an electric field between the common electrode and the pixel electrode to control an orientation of the liquid crystal molecules.

10. A liquid crystal display element, comprising:
    a first substrate having a conductive element formed thereon, said conductive element, comprising:
       a first conductive film;
       a first insulating film covering the first conductive film, said first insulating film having a hole exposing at least one edge face of the first conductive film;
       a second insulating film disposed so as to cover the hole in the first insulating film;
       an upper conductive film disposed on or above the second insulating film, the upper conductive film having an opening that includes a location overlapping said at least one edge face of the first conductive film in a plan view; and
       a second conductive film on the first insulating film and in the hole in the first insulting film so as to contact the first conductive film in the hole, the second conductive film being under the second insulating film;
    a second substrate facing the first substrate; and
    a liquid crystal layer containing liquid crystal molecules between the first substrate and the second substrate,
    wherein the second conductive film is a pixel electrode in each pixel,
    wherein the upper conductive film is a common electrode having a plurality of slit openings and generating an electric field between the common electrode and the pixel electrode to control an orientation of the liquid crystal molecules, and
    wherein the opening in the upper conductive film connects two of the slit openings that are adjacent.

11. A liquid crystal display element, comprising:
    a first substrate having a conductive element formed thereon, said conductive element comprising:
       a first conductive film;
       a first insulating film covering the first conductive film, said first insulating film having a hole exposing at least one edge face of the first conductive film;
       a second insulating film disposed so as to cover the hole in the first insulating film;
       an upper conductive film disposed on or above the second insulating film, the upper conductive film having an opening that includes a location overlapping said at least one edge face of the first conductive film in a plan view, said opening in the upper conductive film straddling over only a portion of said hole in the first insulating film in a plan view so that a portion of the upper conductive film is located inside the said hole in the plan view; and
       a second conductive film on the first insulating film and in the hole in the first insulting film so as to contact the first conductive film in the hole, the second conductive film being under the second insulating film;
    a second substrate facing the first substrate; and
    a liquid crystal layer containing liquid crystal molecules between the first substrate and the second substrate,
    wherein the second conductive film is a pixel electrode in each pixel,
    wherein the upper conductive film is a common electrode having a plurality of slit openings and generating an electric field between the common electrode and the pixel electrode to control an orientation of the liquid crystal molecules, and wherein the opening in the upper conductive film connects two of the slit openings that are adjacent.

* * * * *